(12) United States Patent
Jones et al.

(10) Patent No.: US 11,628,610 B2
(45) Date of Patent: Apr. 18, 2023

(54) PROCESS FOR IN-LINE INSPECTION OF FUNCTIONAL FILM LAYER CONTAINING DETECTABLE COMPONENT

(71) Applicant: Cryovac, LLC, Charlotte, NC (US)

(72) Inventors: Dewitt Jones, Greer, SC (US);
Solomon Bekele, Taylors, SC (US);
Honglei Li, Huntersville, NC (US);
Matthew Dawe, Simpsonville, SC (US); Louise Cynthia Ebner, Charlotte, NC (US)

(73) Assignee: Cryovac, LLC, Charlotte, NC (US)

( * ) Notice: Subject to any disclaimer, the term of this patent is extended or adjusted under 35 U.S.C. 154(b) by 666 days.

(21) Appl. No.: 16/482,557

(22) PCT Filed: Feb. 8, 2018

(86) PCT No.: PCT/US2018/017369
§ 371 (c)(1),
(2) Date: Jul. 31, 2019

(87) PCT Pub. No.: WO2018/148371
PCT Pub. Date: Aug. 16, 2018

(65) Prior Publication Data
US 2020/0001513 A1     Jan. 2, 2020

Related U.S. Application Data

(60) Provisional application No. 62/456,321, filed on Feb. 8, 2017.

(51) Int. Cl.
*B29C 48/92*     (2019.01)
*B29C 48/08*     (2019.01)
(Continued)

(52) U.S. Cl.
CPC .......... *B29C 48/92* (2019.02); *B29C 48/0018* (2019.02); *B29C 48/0019* (2019.02);
(Continued)

(58) Field of Classification Search
CPC ............ B29C 48/0018; B29C 48/0019; B29C 48/08; B29C 48/10; B29C 48/92;
(Continued)

(56) References Cited

U.S. PATENT DOCUMENTS 3,368,007 A    2/1968   Palmer
4,919,855 A    4/1990   Thomas
(Continued)

FOREIGN PATENT DOCUMENTS

AU          429231      10/1972
CN      105479713 A     4/2016
(Continued)

OTHER PUBLICATIONS

Database WPI, Week 20125, Thomson Scientific, London, GB; AN 2012-A33060 XP002780320, 2012.

*Primary Examiner* — Xiao S Zhao
*Assistant Examiner* — Joseph S Leyson
(74) *Attorney, Agent, or Firm* — Jason R. Womer

(57) ABSTRACT

The continuity of a functional layer of a web (32, 60, 78) is assessed by forwarding the web, detecting (42, 63) the presence of the functional layer and a discontinuity and/or a thin region in the functional layer, and generating a signal in response to the discontinuity and/or thin region. The functional layer comprises a detectable component (360) in a thermoplastic composition. The detecting is carried out by a machine vision system capable of detecting the detectable component (360) in the functional layer. The detectable component (360) can be active or passive. Also included are systems for carrying out the process.

19 Claims, 11 Drawing Sheets

(51) Int. Cl.
- *G01N 21/896* (2006.01)
- *B29C 55/28* (2006.01)
- *B29C 71/04* (2006.01)
- *B29C 48/00* (2019.01)
- *B29C 48/91* (2019.01)
- *B29C 48/88* (2019.01)
- *B29C 55/26* (2006.01)

(52) U.S. Cl.
CPC .......... *B29C 48/08* (2019.02); *B29C 48/9105* (2019.02); *B29C 48/919* (2019.02); *B29C 71/04* (2013.01); *G01N 21/896* (2013.01); *B29C 55/26* (2013.01); *B29C 55/28* (2013.01); *B29C 2948/92228* (2019.02); *B29C 2948/92247* (2019.02); *B29C 2948/92257* (2019.02); *B29C 2948/92295* (2019.02); *B29C 2948/92304* (2019.02); *B29C 2948/92438* (2019.02)

(58) Field of Classification Search
CPC .......... B29C 2948/92228; B29C 2948/92247; B29C 2948/92257; B29C 2948/92295; B29C 2948/92304; B29C 2948/92438; B29C 55/26; B29C 55/28; B29C 71/04; G01N 21/896; G01N 2021/8438; G01N 2021/8967

See application file for complete search history.

(56) References Cited

U.S. PATENT DOCUMENTS

| | | | |
|---|---|---|---|
| 6,160,625 A | 12/2000 | Damer et al. | |
| 6,239,883 B1 | 5/2001 | Lam et al. | |
| 6,870,610 B1 | 3/2005 | Struckhoff et al. | |
| 6,962,670 B1 | 11/2005 | Hanson et al. | |
| 7,055,691 B2 | 6/2006 | Safian | |
| 7,499,812 B2 | 3/2009 | Ersue et al. | |
| 7,534,615 B2 | 5/2009 | Havens | |
| 7,602,507 B2 | 10/2009 | Ersue et al. | |
| 7,639,349 B2 | 12/2009 | Ersue et al. | |
| 7,796,276 B2 | 9/2010 | Schipke et al. | |
| 7,858,953 B2 | 12/2010 | Hughes et al. | |
| 8,059,151 B2 | 11/2011 | Ersue et al. | |
| 8,284,396 B2 | 10/2012 | Rudert | |
| 8,295,585 B2 | 10/2012 | Wienand et al. | |
| 8,520,067 B2 | 8/2013 | Ersue | |
| 9,091,533 B2 | 7/2015 | Bachem et al. | |
| 2006/0121613 A1* | 6/2006 | Havens | B32B 27/08 436/3 |
| 2006/0218883 A1 | 10/2006 | Sperry et al. | |
| 2009/0289199 A1* | 11/2009 | Hughes | B32B 41/00 250/459.1 |
| 2009/0299930 A1 | 12/2009 | Konermann | |
| 2011/0161036 A1 | 6/2011 | Keller et al. | |
| 2012/0087968 A1 | 4/2012 | Ebner | |
| 2013/0286192 A1 | 10/2013 | Ramezanifard et al. | |
| 2015/0122878 A1 | 5/2015 | Collick | |
| 2015/0130927 A1 | 5/2015 | Luxen et al. | |
| 2015/0204778 A1 | 7/2015 | Kubiak | |
| 2015/0323458 A1 | 11/2015 | Amano | |
| 2015/0349500 A1 | 12/2015 | Kodani et al. | |
| 2016/0151950 A1 | 6/2016 | Backmann et al. | |
| 2016/0272785 A1 | 9/2016 | Beyer et al. | |

FOREIGN PATENT DOCUMENTS

| | | |
|---|---|---|
| EP | 2570260 A1 | 3/2013 |
| JP | 2012002792 | 1/2012 |
| WO | 2012047947 | 4/2012 |
| WO | 2015069418 | 5/2015 |
| WO | 2016192698 A1 | 12/2016 |

* cited by examiner

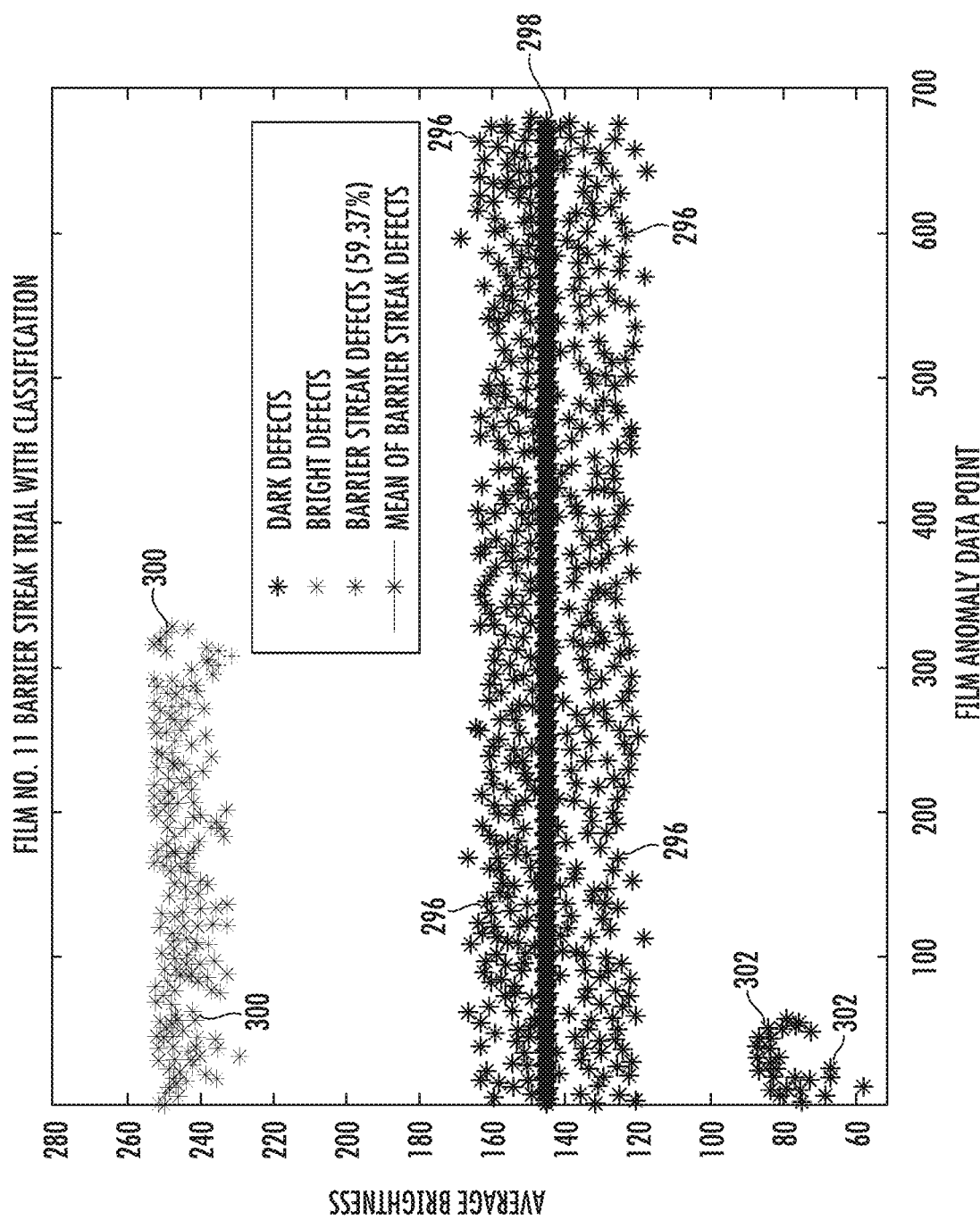

PROCESS FOR IN-LINE INSPECTION OF FUNCTIONAL FILM LAYER CONTAINING DETECTABLE COMPONENT

BACKGROUND

The present invention relates to a process for inspecting films for quality assurance, to ensure that the film is suitable for its intended use.

Many films, particularly packaging films, are made by extruding one or more thermoplastic materials from a die. The thermoplastic materials emerge from the die as a molten stream. For a variety of reasons, there can be anomalies in the film layer or layers, including discontinuities in one or more film layers. Some anomalies are in the shape of continuous die lines running in the machine direction of the film. Other anomalies are in the shape of a spot. Spot discontinuities can result from the materials used, or from material building up in the extruder or the die, with the material passing out through the die opening to become part of the film, causing a discontinuity in the film. Polymer gels can form in the extruder or die and pass through the die to become spot discontinuities (i.e., voids) in the film. The die may have a nick or other damage or buildup which can result in a die line, or material may slough off of the extruder and block a portion of the die opening, resulting in a die line.

Packaging films include both monolayer and multilayer films. In a multilayer film, each film layer has a function, such as, for example, a strength layer, a heat seal layer, an abuse layer, a gloss layer, a barrier layer, an easy-open layer, and a tie layer for adhering two otherwise incompatible layers to one another. The above-described discontinuities may be present in one or more layers of a multilayer film.

Quality assurance methods commonly require that a portion of the film be removed and subjected to off-line analysis. This is time-consuming, laborious, and is frequently destructive of the film sample tested. Moreover, such quality assurance methods check only a small portion of the film. It would be desirable to be able to check one or more layers of the film, over a substantial portion of the film, in order to know the frequency and character of any discontinuities present in one or more layers of the film. Moreover, it is desirable to conduct this quality check quickly and efficiently, without interrupting the process of making the film and without destroying any portion of the film.

SUMMARY OF THE INVENTION

The present invention provides a process by which one or more layers of a film can be inspected for the frequency and character of any discontinuities present, and/or for the suitability of the film layer for carrying out its intended function. Moreover, the inspection can be carried out over a substantial portion of the film, and can be carried out for one or more layers of the film. Moreover, this quality check is quick and efficient, without interrupting the process of making the film as it can be carried out on the moving web. Still further, the process does not destroy any portion of the film. The process is simplified by adding one or more indicator components to one or more layers of the film to allow an automated inspection system to detect discontinuities in the one or more layers of the film. Various embodiments of the process allow continuous, in-line inspection of the entire film to detect any discontinuities down to a small size, such as 2 mm or even less in at least one direction.

A first aspect is directed to a process for assessing continuity of a functional layer of a web. The process comprises forwarding the web at a speed of at least 5 meters per minute, detecting the presence of the functional layer and a discontinuity in the functional layer, and generating a signal in response to the discontinuity in the functional layer. The functional layer comprises a blend of a thermoplastic composition and a detectable component. The detectable component is present in the thermoplastic composition at a level and in a manner that the detectable component is present at a detectable level in the functional layer. The detecting of the presence of the functional layer and a discontinuity in the functional layer is carried out by inspecting the web with a machine vision system capable of detecting the presence or absence of the detectable component in the functional layer.

In an embodiment, the web is a monolayer web. In another embodiment, the web is a multilayer web comprising the functional layer and at least one additional layer.

In an embodiment, for an unoriented annular tape the machine vision system can generate a signal in response to a layer discontinuity having a size down to at least as small as 2 mm in the machine direction and having a size down to at least 1 mm in the transverse direction. In an embodiment, for an oriented heat-shrinkable film tubing the machine vision system is capable of generating a signal in response to a layer discontinuity having a size down to at least as small as 7 mm in the machine direction and 3.5 mm in the transverse direction.

In an embodiment, for an unoriented annular tape the machine vision system can generate a signal in response to a layer discontinuity having a size down to at least as small as 1 mm in the machine direction and having a size down to at least 0.5 mm in the transverse direction. In an embodiment, for an oriented heat-shrinkable film tubing the machine vision system is capable of generating a signal in response to a layer discontinuity having a size down to at least as small as 3.5 mm in the machine direction and 1.8 mm in the transverse direction.

In an embodiment, for an unoriented annular tape the machine vision system can generate a signal in response to a layer discontinuity having a size down to at least as small as 0.2 mm in the machine direction and having a size down to at least 0.1 mm in the transverse direction. In an embodiment, for an oriented heat-shrinkable film tubing the machine vision system is capable of generating a signal in response to a layer discontinuity having a size down to at least as small as 0.7 mm in the machine direction and 0.35 mm in the transverse direction.

In an embodiment, the process further comprises detecting an amount of the detectable component in the functional layer, wherein the amount of the detectable component is proportional to a thickness of the functional layer.

In an embodiment, the functional layer is a member selected from the group consisting of an oxygen barrier layer, an organoleptic barrier layer, and a moisture barrier layer. In an embodiment, the functional layer is an oxygen barrier layer comprising at least one member selected from the group consisting of vinylidene chloride copolymer, saponified ethylene/vinyl acetate copolymer, polyamide, polyester, oriented polypropylene, and ethylene homopolymer.

In an embodiment, the inspecting of the web is carried out over at least 10% of the web.

In an embodiment, the process further comprises forming the web by extruding the thermoplastic material through an annular die to form an annular tape, quenching the tape, and collapsing the tape into lay-flat configuration, with the inspecting of the tape being carried out by scanning the annular tape while the tape is in motion and in a lay-flat configuration, the scanning being carried out by a camera positioned downstream of a point at which the tape is quenched and collapsed into the lay-flat configuration.

In an embodiment, the detecting of the presence the functional layer and discontinuities in the functional layer are carried out by inspecting the web with a machine vision system capable of detecting the presence or absence of the detectable component in the functional layer, including the capability of detecting the presence or absence of the detectable component in both lay-flat sides of the annular tape while the annular tape is in the lay-flat configuration.

In an embodiment, the detecting of the presence the functional layer and discontinuities in the functional layer are carried out by inspecting the web with a machine vision system capable of detecting the presence or absence of the detectable component in the functional layer, including the capability of detecting the presence or absence of the detectable component 360 degrees around the while the annular tape is in a round configuration.

In an embodiment, the scanning is carried out by a camera positioned downstream of a point at which the annular tape is subjected to solid state orientation to form an annular film tubing, the camera being positioned upstream of a point at which the annular film is wound up or slit.

In an embodiment, the detecting of the presence of the functional layer and discontinuities in the functional layer are carried out by inspecting the annular film tubing with a machine vision system capable of detecting the presence or absence of the detectable component in the functional layer, including detecting the presence or absence of the detectable component in both lay-flat sides of the annular film tubing.

In an embodiment, the annular film tubing can be heat-shrinkable.

In an embodiment, the detecting of the presence of the functional layer and discontinuities in the functional layer can be carried out by a camera positioned downstream of a point at which a roll of the annular tape or annular film is being unrolled.

In an embodiment, the annular tape is subjected to solid state orientation to form an annular film which is thereafter converted to a plurality of bags, and the camera is positioned to scan the bags before a product is placed inside the bags.

In an embodiment, the detectable component comprises at least one member selected from the group consisting of ultraviolet-indicator, infrared-indicator, dye, pigment, optical brightener, fluorescent whitening agent, and 2,5-thiophenediylbis(5-tert-butyl-1,3-benzoxazole). 2,5-Thiophenediylbis(5-tert-butyl-1,3-benzoxazole) is marketed as an optical brightener by a plurality of suppliers, including BASF Corporation (TINOPAL OP® 2,5-thiophenediylbis(5-tert-butyl-1,3-benzoxazole) fluorescent brightening agent) and Mayzo, Inc (BENETEX OB PLUS® 2,5-thiophenediylbis(5-tert-butyl-1,3-benzoxazole) fluorescent brightening agent).

In an embodiment, the detectable component is present in the functional layer at a level of at least 1 part per million.

In an embodiment, the detectable component is of a type which, if exposed to radiation at a first peak wavelength, emits radiation at a second peak wavelength.

In an embodiment, the signal generated in response to the discontinuity is used to activate at least one member selected from the group consisting of an alarm, film flagging, displaying an image of a discontinuity, displaying data pertaining to one or more discontinuities, and generating a report of the discontinuity data.

In an embodiment, the signal generated in response to the discontinuity includes at least one member selected from the group consisting of geometric characteristic of the discontinuity, location of the discontinuity, frequency of occurrence of a plurality of discontinuities, severity of discontinuity.

In an embodiment, the signal in response to the discontinuity is generated and activates the alarm, flagging, discontinuity image display, discontinuity data, report of discontinuity data, etc while the web remains in motion, i.e., instantaneously and online. Alternatively, the signal in response to the discontinuity is generated after production is complete, i.e., offline. The signal in response to the discontinuity can include electronic messaging, email, data log, and report.

In an embodiment, the process is carried out wherein: a) the web is forwarded at a speed of at least 30 meters per minute; b) the detectable component is present in the thermoplastic composition at a level of from 0.5 to 150 ppm; c) the detecting of the presence the functional layer and the discontinuity in the functional layer are carried out by inspecting the web with a machine vision system capable of generating a signal indicating the presence or absence of the detectable component in the functional layer, by scanning transversely across the web and generating a signal in response to the presence, absence, and amount of the detectable component present in a functional layer of the web, wherein: (c)(i) the machine vision system comprises a line-scan camera scanning at a speed of from 50 to 1000 megahertz and at an exposure time of from $2 \times 10^{-3}$ second to $1 \times 10^{-5}$ second; (c)(ii) in an unoriented annular tape the machine vision system is capable of generating a signal in response to a layer discontinuity having a size down to at least as small as 2 mm in the machine direction and having a size down to at least 1 mm in the transverse direction, or in an oriented heat-shrinkable film tubing the machine vision system is capable of generating a signal in response to a layer discontinuity having a size down to at least as small as 7 mm in the machine direction and at least as small as 3.5 mm in the transverse direction; and (c)(iii) the machine vision system scans with a pixel count of from 500 to 50,000 per scan.

In an embodiment, the process is carried out wherein: a) the web is forwarded at a speed of at least 50 meters per minute; b) the detectable component is present in the thermoplastic composition at a level of from 1 to 20 ppm; c) the detecting of the presence the functional layer and the discontinuity in the functional layer are carried out by inspecting the web with a machine vision system capable of generating a signal indicating the presence or absence of the detectable component in the functional layer, by scanning transversely across the web and generating a signal in response to the presence, absence, and amount of the detectable component present in a functional layer of the web, wherein: (c)(i) the machine vision system comprises a line-scan camera scanning at a speed of from 100 to 750 megahertz and at an exposure time of from $7 \times 10^{-3}$ second to $3 \times 10^{-5}$ second; (c)(ii) in an unoriented annular tape the machine vision system is capable of generating a signal in response to a layer discontinuity having a size down to at least as small as 1 mm in the machine direction and having a size down to at least 0.5 mm in the transverse direction, or in an oriented heat-shrinkable film tubing the machine vision system is capable of generating a signal in response to a layer discontinuity having a size down to at least as small as 3.5 mm in the machine direction and at least as small as 1.8 mm in the transverse direction; and (c)(iii) the machine vision system scans with a pixel count of from 1,000 to 15,000 per scan.

In an embodiment, the process is carried out wherein: a) the web is forwarded at a speed of from 60 to 150 meters per minute; b) the detectable component is present in the thermoplastic composition at a level of from 2 to 10 ppm; c) the detecting of the presence the functional layer and the discontinuity in the functional layer are carried out by inspecting the web with a machine vision system capable of generating a signal indicating the presence or absence of the detectable component in the functional layer, by scanning transversely across the web and generating a signal in response to the presence, absence, and amount of the detectable component present in a functional layer of the web, wherein: (c)(i) the machine vision system comprises a line-scan camera scanning at a speed of from 200 to 500 megahertz and at an exposure time of from $2 \times 10^{-4}$ second to $5 \times 10^{-5}$ second; (c)(ii) in an unoriented annular tape the machine vision system is capable of generating a signal in response to a layer discontinuity having a size down to at least as small as 0.2 mm in the machine direction and having a size down to at least 0.1 mm in the transverse direction, or in an oriented heat-shrinkable film tubing the machine vision system is capable of generating a signal in response to a layer discontinuity having a size down to at least as small as 0.7 mm in the machine direction and at least as small as 0.35 mm in the transverse direction; and (c)(iii) the machine vision system scans with a pixel count of from 3,000 to 9,000 per scan.

A second aspect is directed to a process for assessing continuity of a functional layer of a film, comprising forwarding the film at a speed of at least 5 meters per minute, detecting the presence of the functional layer and a thickness of the functional layer by inspecting the film with a machine vision system capable of detecting the presence or absence of the detectable component in the functional layer and an amount of the detectable component in the functional layer; and generating a signal in response to the amount of the detectable component in the functional layer. The functional layer comprises a thermoplastic composition and a detectable component, the detectable component being present in the thermoplastic composition so that the detectable component is present at a detectable level in the functional layer. The second aspect can utilize one or more features of the various embodiments disclosed above for the first aspect.

A third aspect is directed to a system for assessing layer continuity in a moving web, the system comprising (A) a web forwarding device forwarding the web at a speed of from 1 to 1000 meters per minute, the web having a functional layer comprising a thermoplastic composition having a detectable component therein; (B) an image generator for generating image data of the detectable component in the functional layer of the moving web as the web is being forwarded by the web forwarding device; (C) a data acquisition system for acquiring the image data of the web from the image generator; and (D) a vision inspection engine for receiving and analyzing the image data to identify and classify the presence and absence of defects in the web using the image data received from the data acquisition system, the vision inspection system generating an alert identifying the presence or absence of a defect in the web. The third aspect can utilize one or more features of the various embodiments disclosed above for the first aspect.

A fourth aspect is directed to a system capable of detecting a detectable component in a moving web, the system comprising: (A) an image generator for generating image data of a detectable component in the web as the web is being forwarded from a web supply; (B) a data acquisition system for acquiring the image data from the image generator, the image data being of the detectable component in the web; and (C) a vision inspection engine for receiving and analyzing the image data from the web, the vision inspection engine identifying and classifying the presence and absence of defects in the web using the image data from the web received from the data acquisition system, the vision inspection system generating an alert identifying the presence or absence of a defect in the web. The fourth aspect can utilize one or more features of the various embodiments disclosed above for the first aspect.

A fifth aspect is directed to a system capable of detecting a detectable component in a moving web, the system comprising: (A) a detector oriented and adapted to generate sensed film data of a detectable component in a film being forwarded towards the detector from a film supply; (B) a data acquisition system that acquires and collects the sensed film data from the detector; and (C) an inspection engine that receives and analyzes the sensed film data and compares at least one characteristic of the sensed film data against at least one threshold to identify and classify the presence and absence of defects in the film using the sensed film data, the inspection system generating an alert identifying the presence or absence of a defect in the web. The fifth aspect can utilize one or more features of the various embodiments disclosed above for the first aspect.

In an embodiment, the detector can detect a discontinuity in a film layer containing the detectable component. In an embodiment, the detector can be a UV-sensor, a sensor array, or a sensor matrix. In an embodiment the system may comprise an encoder to correlate the position of a discontinuity or film thinning on the web while the web is being forwarded at a film processing speed.

BRIEF DESCRIPTION OF THE DRAWINGS

FIG. 12 is a plot of brightness (Y axis) as a function of time (X axis) in the machine vision inspection of Film No. 11.

DETAILED DESCRIPTION

Figure 1A:
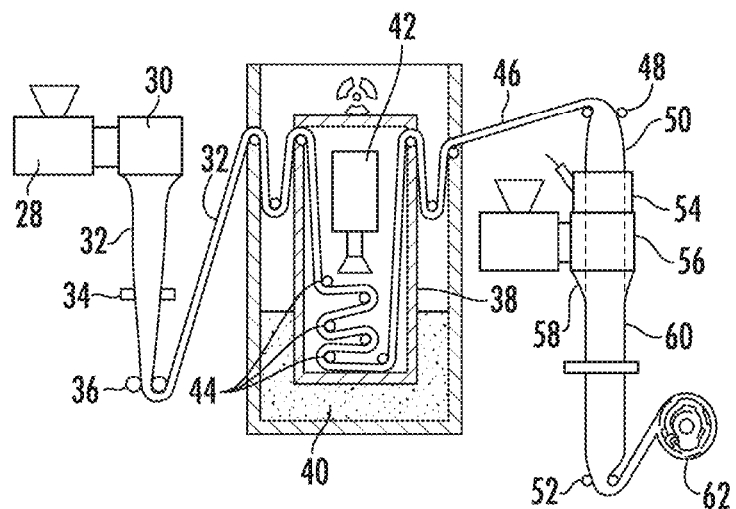
FIG. 1A is a schematic of a web production process for extruding an annular web which is coated to make a multilayer annular tape.

As used herein, the term "film" is inclusive of plastic web, regardless of whether it is film (up to 10 mils thick) or sheet (greater than 10 mils thick). In an embodiment, the orientation of a web in the solid state to produce a heat shrinkable film can be carried out by first extruding a monolayer or multilayer thermoplastic annular "tape," which is thereafter quenched and collapsed into its lay-flat configuration, and thereafter optionally irradiated (to crosslink the polymer) and optionally extrusion coated with one or more additional thermoplastic layers, following which the annular tape is reheated to its softening point and then biaxially oriented (i.e., stretched in the transverse direction and drawn in the machine direction) while in the solid state in a trapped bubble process to result in a heat-shrinkable film, as described in examples below and as illustrated in FIGS. 1A and 1C. The result is a heat-shrinkable film tubing, i.e., a film having a total (i.e., longitudinal plus transverse, L+T) free shrink of at least 10% at 185° F. (85° C.).

As used herein, the phrase "machine direction" and "MD" refer to the direction in which the film is made as it is produced, i.e., the direction of the melt stream coming out of the die during extrusion. As used herein, the phrase "transverse direction" and "TD" refer to the direction which is perpendicular to the machine direction.

As used herein, the phrase "functional layer" refers to a layer of monolayer or multilayer film that has one or more functions, such as, for example, a strength layer, a heat seal layer, an abuse layer, a gloss layer, a barrier layer, a shrink layer, an easy-open layer, or a tie layer for adhering two otherwise incompatible layers to one another. The functional layer comprises a thermoplastic polymer. The above-described discontinuities may be present in one or more layers of a multilayer film.

As used herein, the term "barrier", and the phrase "barrier layer", as applied to films and/or film layers, are used with reference to the ability of a film or film layer to serve as a barrier to one or more gases. In the packaging art, oxygen (i.e., gaseous $O_2$) barrier layers have included, for example, hydrolyzed ethylene/vinyl acetate copolymer (designated by the abbreviations "EVOH" and "HEVA", and also referred to as "ethylene/vinyl alcohol copolymer"), polyvinylidene chloride, amorphous polyamide, polyamide MXD6, polyester, polyacrylonitrile, etc., as known to those of skill in the art. In addition to the first and second layers, the heat-shrinkable film may further comprise at least one barrier layer.

The phrase "oxygen transmission rate" ("OTR") is defined herein as the amount of oxygen in cubic centimeters ($cm^3$) which will pass through 100 square inches of film in 24 hours at 0% relative humidity and at 23° C. The thickness (gauge) of the film has a direct relationship on the oxygen transmission rate. Packaging films which are useful as an oxygen barrier are required to have an OTR value of from about 0 to 10.0 $cm^3/100$ $in^2$ over 24 hr at 0% relative humidity and 23° C. at 1.0 mils or less. Oxygen transmission may be measured according to ASTM D-3985-81 which is incorporated herein by reference.

As used herein, the phrase "assessing the continuity of the functional layer" includes both assessing the functional layer for the presence of discontinuities, as well as assessing the functional layer for the regions which are thin enough that the function of the layer is substantially diminished.

As used herein, the term "inspecting" refers to taking one or more images of the web (i.e., tape or film) with a point source device or by scanning the film.

As used herein, the term "scanning" refers to the use of a sensor array or sensor matrix, or a moving sensor, to generate a series of signals indicating the presence or absence of a detectable component in a small region across a plurality of spatially arranged areas. In an embodiment, the spatially arranged areas are across the film or web.

As used herein, the phrase "detectable component" refers to any component that is added to a thermoplastic material extruded to make a film layer, which component is detectable by a detector, machine vision, or any other means for determining the presence or absence of the component in a particular area of the film.

As used herein, the term "blend," as applied to the detectable component, includes the physical blending of the detectable component with one or more polymers used in the film layer, or modifying one or more of the polymers used in the film layer by reacting the detectable component with the polymer chain, or blending the detectable component with one or more monomers which are thereafter polymerized to produce the polymer in the film or film layer.

As used herein, the phrase "in-line" refers to carrying out the scanning of the web while the web is being forwarded, and without having to remove a portion of the web for the analysis, and without having to destroy any portion of the web while carrying out the analysis. The forwarding can be between extrusion and orientation, after orientation but before windup, or in subsequent film processing.

Scanning can be carried out with one or more cameras. Scanning can be performed on an open film tape or tubing (i.e., in circular configuration) or in lay-flat configuration. A film tape or tubing in lay-flat configuration may be scanned with a single in-line camera, a film tape or tubing in circular configuration may require at least two cameras in order to be scanned.

As used herein, the phrase "wherein the signal is generated in response to discontinuities at least as small as 2 mm in a designated direction" refers to a system capable of generating a signal in response to discontinuities greater than 2 mm in the designated direction (i.e., in the machine direction and/or the transverse direction), as well as discontinuities of 2 mm in the designated direction, and optionally discontinuities even less than 2 mm in the designated direction. That is, this phrase means that the machine vision system is capable of generating a signal in response to discontinuities down to at least as small as the specified size in the designated direction.

In an embodiment, for an unoriented annular tape the machine vision system is capable of generating a signal in response to a layer discontinuity having a size down to at least as small as 2 mm in the machine direction and having a size down to at least 1 mm in the transverse direction. In an embodiment, for an unoriented annular tape the machine vision system is capable of generating a signal in response to a layer discontinuity having a size down to at least as small as 1 mm in the machine direction and having a size down to at least 0.5 mm in the transverse direction. In an embodiment, for an unoriented annular tape the machine vision system is capable of generating a signal in response to a layer discontinuity having a size down to at least as small as 0.2 mm in the machine direction and having a size down to at least 0.1 mm in the transverse direction.

In an embodiment, for an oriented heat-shrinkable film tubing the machine vision system is capable of generating a signal in response to a layer discontinuity having a size down to at least as small as 7 mm in the machine direction and 3.5 mm in the transverse direction. In an embodiment, for an oriented heat-shrinkable film tubing the machine vision system is capable of generating a signal in response to a layer discontinuity having a size down to at least as small as 3.5 mm in the machine direction and 1.8 mm in the transverse direction. In an embodiment, for an oriented heat-shrinkable film tubing the machine vision system is capable of generating a signal in response to a layer discontinuity having a size down to at least as small as 0.7 mm in the machine direction and 0.35 mm in the transverse direction.

The signal can be an analog signal or a digital signal. In an embodiment, the signal is processed to detect the presence or absence of the detectable component in a region of the functional layer, thereby detecting whether a discontinuity is present in the region of the functional layer to which the signal applies. In another embodiment, the signal is processed to detect the amount of the detectable component in a region of the functional layer, thereby detecting the thickness of the functional layer in the region of the film to which the signal applies.

In an embodiment, scanning is carried out using line-scan vision technology in which a series of images (each image contains 4096 pixels) in a line is taken across 100% of the width of the web, with each image covering only $1/4096$ of the width of the web if the camera is set so that the length of the line is the same as the width of the web. However, as the length of the line is generally set to be somewhat longer than the width of the web, each image generally covers from about 0.025% (i.e., $1/4000^{th}$) to about 0.1% (i.e., $1/1000^{th}$) of the distance across the web. Moreover, as the web is generally traveling between 30 and 300 meters per minute (i.e., 0.5 to 5 m/sec). Thus, if images are taken at a rate of $1 \times 10^4$ images/sec, each image generally covers a web length of 0.05 mm to 0.5 mm.

In an embodiment, the combination of the identity and concentration of the detectable component in the functional layer, the thickness of the functional layer, and the identity of the machine vision system, is capable of detecting discontinuities down to at least as small as 2 mm in at least one direction. The phrase "discontinuities down to at least as small as 2 mm in at least one direction" refers to the degree of resolution of the combination. Alternatively, the combination is capable of detecting discontinuities down to at least as small as 1.5 mm in at least one direction, or down to at least as small as 1 mm in at least one direction, or down to at least as small as 0.8 mm in at least one direction, or down to at least as small as 0.5 mm in at least one direction, or down to at least as small as 0.4 mm in at least one direction, or down to at least as small as 0.3 mm in at least one direction, or down to at least as small as 0.2 mm in at least one direction, or down to at least as small as 0.1 mm in at least one direction, or down to at least as small as 0.05 mm in at least one direction. Discontinuities can be categorized as small, medium, and large discontinuities. A small discontinuity is below 2 mm in at least one direction. A medium sized discontinuity is from 2 to 5 mm in at least one direction. A large discontinuity is at least 5 mm in at least one direction.

If the detectable component is entirely undetected in the film, it could be because (i) because the functional layer (e.g., barrier layer) is entirely absent from the film, or (ii) because the functional layer is thinned down overall or just in one or more areas, with the thinning down being to a degree that the level of the detectable component is too low to be detectable or below a pre-set threshold level. This could occur if the wrong film is produced or selected, i.e., a film without the functional layer, or a film in which the entirety of the functional layer is thinner than the desired thickness of the functional layer, or a film in which one or more portions of the functional layer are thinner than the desired thickness of the functional layer.

As used herein, the term "discontinuity" refers to any discontinuity in the functional layer of a film containing the functional layer, with the discontinuity being represented by a thinner functional layer beginning at a thickness just below a minimum acceptable level, all the way down to the complete absence of the functional layer in the film or in one or more regions of the film, or at least down to below the minimum detectable limit of the indicator per unit area of the functional layer. The term "discontinuity" includes any one or more of the following: (i) any detectable lack of continuity of the indicator within an indicator-containing functional layer of a film, (ii) any detectable reduction in the level of the indicator in a specific region of the film, (iii) the detection of an undesirable object in the film that does not contain the indicator (iv) the complete absence of the indicator from the functional layer of the film, and (iii) the indicator being entirely absent from the film, regardless of whether or not the functional layer is present. The meaning of the term "anomaly," as used herein, is the same as the meaning of the term "discontinuity" as used herein.

The camera can be a monochrome camera or a color camera, and can be an area scan camera or a line-scan camera. Line-scan cameras are preferred because they are more economical and the data from a line-scan camera is easier and faster to process. Regardless of whether the camera is a color camera or a monochrome camera, the camera should be set to receive the wavelength of irradiation transmitted from or reflected by the detectable component. The image is processed by extracting the features, with an alarm or report or label being activated if a discontinuity is detected in the signal. The extracted features in the image data can be processed by comparing the extracted features with the stored defect features.

As used herein, the phrase "vision system" includes optical systems as well as acoustic systems to detect the presence or absence of the detectable component in the functional layer.

In an embodiment, the process can be carried out while the film is being forwarded at a speed of at least 10 m/min, or at least 20 m/min, or at least 40 m/min, or at least 60 m/min, or at least 80 m/min, at least 100 m/min, or at least 120 m/min, or at least 140 m/min. In an embodiment, the process can be carried out while the film is being forwarded at a speed of from 1 to 1,000 m/min, or from 25 to 500 m/min, or from 40 to 300 m/min, or from 60 to 200 m/min, or from 80 to 180 m/min, 100 to 160 m/min, or from 110 to 140 m/min.

A web, extruded from an annular die as an annular "tape," is extruded relatively thick if a heat-shrinkable film is ultimately desired. The annular tape is designed to subsequently undergo solid state orientation for the making of the annular heat shrinkable film tubing.

The annular tape can be a fully coextruded, or can be prepared by extrusion coating, as described in the examples below. In an embodiment, the annular tape can have a thickness of at least 11 mils, or at least 15 mils, or at least mils; or from 11 to 50 mils, or from 15 to 40 mils, or from 20 to 30 mils.

The annular tape can be stretched and drawn in the solid state to produce a heat shrinkable film tubing. In an embodiment, the heat-shrinkable film tubing has a total thickness of at least 0.5 mil, or at least 1 mil, or at least 1.5 mils, or at least 2 mils, or at least 2.5 mils, or at least 3 mils, or at least 5 mils, or at least 7 mils. In an embodiment, the heat-shrinkable film tubing has a thickness of from 0.5 to 10 mils, or from 1 to 7 mils, or from 1.2 to 5 mils, or from 1.3 to 4.5 mils, or from 1.4 to 4 mils, or from 1.5 to 3.5 mils, or from 1.6 to 3 mils, or from 1.7 to 2.5 mils.

The annular tape emerging from the annular die can be quenched and thereafter reheated to its softening point and oriented while in the solid state. The inspecting for discontinuities and/or layer thickness can be carried out on the annular tape before it is oriented in the solid state. Moreover, the inspecting can be carried out on the annular tape in its lay-flat configuration. Alternatively, the inspection can be carried out on the oriented film after the solid state orientation. In an embodiment the inspection of the oriented film can be carried out as an inspection of the oriented film tubing in its lay-flat configuration.

Alternatively, the film can be extruded as a flat tape from a slot die. If a heat-shrinkable flat film is desired, the flat tape can thereafter be heated to its softening point and oriented while in the solid state, for example via tenterframe, to produce the heat-shrinkable flat film. The flat tape can be inspected before it is oriented, or after the solid state orientation.

In an embodiment, the process is carried out by inspecting through the full thickness of the film over an area of at least 10% of the surface of the film. In alternative embodiments, the process is carried out by inspecting through the full thickness of the film, at least 20%, or at least 30%, or at least 40%, or at least 50%, or at least 60%, or at least 70%, or at least 80%, or at least 90%, or at least 95%, or at least 98%, or at least 99%, or at least 99.5%, or at least 99.9%, or 100% of the multilayer film.

In an embodiment, the functional layer functions as a barrier layer. The barrier layer can be an oxygen barrier layer, an organoleptic barrier layer (barrier to aroma and/or flavor components), a moisture barrier layer, or any other barrier layer known to those of skill in the film art.

Suitable moisture barrier layers include ethylene-based polymers such as high density polyethylene, polypropylene (especially biaxially oriented polypropylene), polyester, polystyrene, and polyamide.

Suitable thermoplastic oxygen barrier layers include polyvinylidene chloride (PVDC), saponified ethylene/vinyl acetate copolymer (also commonly referred to as ethylene/vinyl alcohol copolymer, or EVOH), polyamide, polyester, oriented polypropylene, and ethylene homopolymer.

Inspecting an oxygen barrier layer of a film provides added value to the film because the ingress of oxygen into a package containing an oxygen-sensitive product can shorten the shelf life of the product or render the product inoperable for its intended use. Pharmaceuticals, medical devices, corrodible metals, analytical chemicals, electronic devices, foods (including meat), beverages, and many other products experience diminished shelf life, spoil, or become inoperable if stored too long in the presence of oxygen. To combat this problem, packaging materials and packaging systems have been developed to protect these products by providing a package environment, or "headspace," with reduced oxygen levels.

Reduced oxygen levels can be obtained by packaging under vacuum, or by displacing the atmosphere and substituting a modified atmosphere (e.g., low in oxygen) around the product. In some cases, the low oxygen level that can be obtained with these packaging systems is still insufficient to provide the desired shelf life.

In food packaging, the purpose of the barrier layer is to substantially increase the shelf life of the food and prevent food spoilage. The barrier layer can be extremely thin in some multilayer food packaging film. A low-defect-level or defect-free barrier layer assists in extending the shelf life of the packaged food product. If a vacuum package or modified atmosphere package has a significant discontinuity and the oxygen barrier layer and allows atmospheric oxygen to enter the package, ultimately the atmospheric oxygen content within the package will increase, reducing the shelf life of the product.

In an embodiment, a detectable component (e.g., an ultra-violet (UV) fluorescing agent) is blended with an oxygen barrier resin such as PVDC or EVOH, or even included with the reactants which polymerize to form the PVDC or EVOH. Providing the detectable component within the barrier resin at a consistent level so that the detectable component is homogeneously dispersed throughout the resin (and thereby dispersed throughout the resulting film layer) allows for accurate monitoring and identification of discontinuities in the barrier layer. Homogeneity can be accomplished by blending and/or compounding steps as known to those of skill in the art of blending additives into polymers or preparing polymers in the presence of additives. For example, making a homogeneous blend of 15 ppm indicator with a thermoplastic polymer can be carried out using staged blending, as follows. In a first blending stage, 3 parts by weight indicator masterbatch are blended with 97 parts by weight primary polymer, resulting in a first stage blend containing indicator at a level of 30,000 ppm. In a second blending stage, part or all of the first stage blend is diluted 20:1 with the primary polymer, resulting in a second stage blend containing indicator at a level of 1500 ppm. In the third stage blend, part or all of the second stage blend is diluted 100:1 with the primary polymer, resulting in a third stage blend which contains indicator at a level of 15 ppm indicator. In each stage, blending is carried out to a high degree of uniformity by using, for example, a high shear mixer. The homogeneity of the resulting blend also allows the barrier resin to retain its barrier function in the barrier layer of the film.

The detectable component can be added at a low level (e.g., 20 ppm) such that the layer retains its barrier property but the detectable component is present at a level high enough that it is readily detectable by the machine vision system. If a UV-fluorescing agent is used, upon receiving UV radiation that excites the fluorescing agent, the UV agent is provided at a level high enough that its fluorescence can be readily detected by the machine vision system, but at the same time at a level low enough that the presence of the UV agent does not substantially reduce the oxygen barrier character of the oxygen barrier polymer from which the barrier layer is made.

The detectable component/barrier material blend can then be extruded alone or in combination with one or more additional melt streams, to form a monolayer or multilayer film. In an embodiment, during the film manufacturing process the vision system can be employed in-line to generate a signal that is used to identify discontinuities that may be present in the barrier layer by detecting the presence and absence of the detectable component. In an embodiment, the output signal from the machine vision system can be used to monitor the thickness of the barrier layer to ensure that the layer provides adequate oxygen barrier throughout the film structure, and regions of the barrier layer which are too thin may not provide the level of oxygen barrier required to obtain the desired protection or desired shelf life.

Although the presence of the detectable component in the packaged product is preferably not readily visible to a consumer, if a UV-fluorescing agent is used as the detectable component, a product packager using a roll of such a film to package product is able to positively confirm the presence or absence of the barrier layer in the film by simply illuminating the roll of film with a UV-light (e.g., UV flashlight) to cause the UV agent to fluorescence, thereby confirming the presence or absence of the oxygen barrier layer in the film based on whether the desired fluorescence is observed.

The ability to immediately identify a barrier layer in a film is important because a wide variety of films are utilized for packaging, with some of the films requiring a barrier layer and other packaging films not requiring a barrier layer. If a non-barrier film is inadvertently mislabeled as a barrier film, or inadvertently utilized to package a product which requires a barrier film, the shelf life of a product packaged in the film may be compromised, potentially resulting in product damage. The presence of, for example, the UV fluorescing agent in an oxygen barrier layer of the film, allows for quick and accurate testing to positively confirm the presence or absence of the barrier layer in the film, thereby minimizing the chance that an oxygen-sensitive product is packaged in a film lacking an oxygen barrier layer.

In addition to using the presence of the indicator to instantly assess whether the barrier layer (or any functional layer containing the indicator) is present, and in addition to using the indicator in the functional layer to assess the film for discontinuities in the functional layer, the presence of the indicator in a functional layer can be used to assess the thickness of the functional layer, and to assess the functional layer for the presence of areas which are thicker and/or thinner than the desired thickness of the functional layer. In a functional layer in which the concentration of, for example, a fluorescing indicator is evenly dispersed, a thin region will fluoresce less than (i.e., be darker than) a region at the desired thickness; a thick region will fluoresce more than (i.e., be brighter than) a region at the desired thickness.

In an embodiment, the combination of the detectable component in the barrier layer and the vision system allow continuous monitoring of the barrier layer as the film is produced or processed. The process can identify the presence of barrier layer discontinuities (i.e., barrier layer defects), can optionally be designed to classify the defects based on size and type, can optionally be designed to map the location of the defects and even tag the film at any region(s) at which a defect is located, can optionally count and record the number and classification of the defects, including cumulative defect counts. In an embodiment this process of monitoring can be carried out in-line, i.e., on a moving web. In an embodiment the process can monitor 100% of the barrier layer.

Numerous mechanisms can produce a discontinuity in a functional layer of a film, or substantial thinning of a region of a functional layer of the film. Discontinuities and substantially thinned regions can be caused by, for example, lack of barrier material in the extrusion system, bubbles or voids in the melt stream, die lines, and contaminants (non-barrier materials) passing through the die with the barrier polymer. The discontinuities or thinned regions can be elongated, as in the case of die lines, or circular or odd-shaped regions void of barrier material, as due to a bubble or void or non-barrier contaminant passing through the die. The discontinuities can occupy a region of that portion of the film which is intended to be the barrier layer.

In an embodiment, the process can be used to inspect the film in a manner that reveals the thickness of the barrier layer containing the detectable component. Moreover, as with the detection of discontinuities, the monitoring of the thickness of the barrier layer can be carried out on a moving web, and may be carried out over the entire web. Thinned regions of the film can result from a variety of causes, such as the buildup of material on the die lip. Although a thinned region is not a discontinuity of the barrier layer, the thinned region can decrease the barrier property of the barrier layer to an extent that the portion of the film having the thinned barrier layer is unfit for the desired packaging end use.

It has been found that the detectable component, such as a UV-fluorescing agent, can be provided at a level which allows the machine vision system to both detect discontinuities in the barrier layer, as well as to quantify the thickness of the barrier layer. Maintaining a desired minimum thickness level of the barrier layer provides the desired low oxygen transmission rate through the film. The process and system of the invention can generate a signal which indicates whether the barrier layer of the film is below the minimum acceptable thickness.

The process can also be used to inspect additional kinds of film barrier layers, such as hazardous chemical barrier layers. For example, film layers made from various cyclic olefin copolymers have been used as alcohol barriers. Such layers can have a detectable component added so that they can be inspected by a machine vision system in the same manner as the inspection of the film having an oxygen barrier layer, i.e., as described above.

In addition, packaging designed to provide a microbial barrier may contain an active agent that neutralizes microbes, as described in US 2012/0087968 A1 and WO 2012/047947, each of which is hereby incorporated, in its entirety, by reference thereto. Some of these films are designed for food packaging. Others are designed for non-food-contact end uses. Food-contact films containing materials approved for food use may include, for example, naturally derived materials such as antibiotic, bacteriocin, chitosan, enzyme, natural extract, peptide, polysaccharide, protein, and/or allylisothiocyanate.

Other films may have a layer containing one or more acids such as: acetic acid, citric acid, cinnamic acid, lactic acid, lauric acid, octanoic acid, propionic acid, sorbic acid, and/or benzoic acid. Such a layer can be provided with a detectable component added so that the layer can be inspected by a machine vision system in the same manner as the inspection of the film having an oxygen barrier layer, i.e., as described above.

Still other films may have a layer containing acid salt, bacteriocin, bacteriophage, 1,2-Benzisothiazolin-3-one, BHA/BHT, cetyl pyridinium chloride, chitosan, chlorine dioxide, imazalil, lysozyme, and/or lactoferrin. Such a layer can be provided with a detectable component therein so that the layer can be inspected by a machine vision system in the same manner as the inspection of the film having an oxygen barrier layer, i.e., as described above.

Still other films may have a layer containing a metal or metal salt (e.g., silver, copper, or zinc), metal oxide, and/or monolaurin. Such a layer can be provided with a detectable component added so that the layer can be inspected by a machine vision system in the same manner as the inspection of the film having an oxygen barrier layer, i.e., as described above.

Still other films may have a layer containing a natural oil or extract such as thymol, eugenol, vanillin, garlic oil, grape seed extract, cinnamon, onion, basil, oregano, bay, and/or clove. Such a layer can be provided with a detectable component added so that the layer can be inspected by a machine vision system in the same manner as the inspection of the film having an oxygen barrier layer, i.e., as described above.

Still other films may have a layer containing polyhexamethylene biguanide hydrochloride, paraben, grafted silane-quaternary amine, triclosan, and zeolite of silver, copper, and/or zinc. Such a layer can be provided with a detectable component added so that the layer can be inspected by a machine vision system in the same manner as the inspection of the film having an oxygen barrier layer, i.e., as described above.

The addition of a detectable component to a film layer allows the film layer to be detected by a sensor system. Without the detectable component, the sensor system would not be able to detect the presence of the film layer. The detectable component may be passive, i.e., a responding system, such as simple absorption by a pigment or dye. The detectable component may be reactive, or active, i.e., responsive to irradiation with thermal IR, near IR, visible, or UV light by mechanisms such as phase change (thermochromic materials), fluorescence, or photochromism. A passive detectable component does not require an external source of energy to perform its intended detectability function, whereas an active component is excited by an external source of energy and converts that energy to perform its intended detectability function. In an embodiment, the detectable component is non-migratory, i.e., it does not migrate from one layer of a film to another, or from the interior of a film layer to the surface of the layer.

An active sensor system can be designed to sweep across a broad geographic area. The detectable component generates a unique reply making the detectable component (and hence, the layer) stand out to the sensor system.

The addition of the detectable component may also provide the film layer with a high signal-to-noise ratio. The detectable component may operate with a phenomenology and in a sensing band where noise is uncommon, thereby further enhancing the effective signal-to-noise ratio. The signal-to-noise ratio can also be affected by the intensity of the incident light used to excite an active detectable component. The incident light intensity can be increased or decreased, by trial and error, until the average signal to noise ratio is 10 or higher.

Sound can also be used as the active phenomena for the detectable component. For example, the detectable component can emit an ultrasonic acoustic wave, or operate within the electromagnetic spectrum. Sound as the active phenomena operates upon sensing the resulting pressure wave propagating through matter. The detectable component may be acoustic-based, e.g., providing an ultrasonic sensing capability. As such, the detectable component may be a piezoelectric transducer (PZT).

The electromagnetic spectrum can be the active phenomena for the detectable component. In a system utilizing the electromagnetic spectrum as the active phenomena for the detectable component, the term "detectable" refers to detection in the visible spectrum, or in the infrared spectrum, or in the ultraviolet spectrum, or in any portion of the electromagnetic spectrum outside of those spectrums. A significant advantage of working within the electromagnetic spectrum is the very high propagation velocity for the signals involved, i.e., the speed of light.

The detectable component can be present in the functional layer at any level that is detectable by the detector while allowing the functional layer to maintain its intended function. Too much detectable component can interfere with layer function. Too little detectable component can become undetectable to the detector. In an embodiment, the detectable component can be present at a level of at least 0.5 parts per million (ppm). As used herein, the phrase "part per million" and the equivalent expression "ppm" refer to the weight of the detectable component versus the total weight of the layer (weight detectable component+weight of remainder of components in the layer). Of course, the majority component of the layer is one or more thermoplastic polymers which are a solid at room temperature. Both the detectable component and the thermoplastic polymer of the layer can be solids at room temperature. In an embodiment, the detectable component can be present at a level of at least 1 ppm, or at least 1.5 ppm, or at least 2 ppm, or at least 3 ppm, or at least 5 ppm, or at least 10 ppm, or at least 20 ppm, or at least 40 ppm, or at least 80 ppm, or at least 120 ppm, or at least 160 ppm, or at least 200 ppm, or at least 300 ppm, or at least 500 ppm. In an embodiment, the detectable component can be present in the layer at a level of from 0.5 to 40 ppm, or from 1 to 20 ppm, or from 1.5 to 10 ppm, or from 2 to 5 ppm. In order for a film to be suitable for food contact end use, the detectable component must be present in the layer in an amount of not more than 150 ppm.

In an embodiment, the detectable component is a composition capable of emitting electromagnetic radiation. The emitted radiation can be from any portion of the electromagnetic spectrum, such as radio waves, infrared light, visible light, ultraviolet light, X-rays, gamma rays, etc. The detectable component can be excited by incident electromagnetic radiation which causes the detectable component to emit electromagnetic radiation. The incident radiation to excite the detectable component, and the emitted radiation from the detectable component, may be unique to the detectable component, and depending upon the identity of the detectable component, may be from any portion of the electromagnetic spectrum.

A UV-based detectable component is a UV-absorbing compound with distinctive absorption and/or fluorescence properties. Preferred UV-absorbing detectable component has a unique optical signature that is not present in nature and not easily confused with signals from natural sources. A preferred UV-detectable component has multiple unique absorption or fluorescent features in its UV spectra. For example, as used herein, electromagnetic radiation at 375 nanometers was used as incident radiation to excite a detectable component known as 2,5-thiophenediylbis(5-tert-butyl-1,3-benzoxazole), which is assigned CAS registry number 7128-64-5, and which is also known as: 2,2'-(2,5-thiophenediyl)bis[5-tert-butylbenzoxazole]; 2,5-bis-2(5-tert-butyl-benzoxalyl)thiophene; 2,5-bis(5-t-butyl-2-benzoxazolyl)thiophene; 2,5-bis-(5-t-butylbenzoxazolyl-[2-yl])-thiophene; 2,5-bis-(5-tert-butyl-2-benzoxazol-2-yl)thiophene; 2,5-bis(5'-tert-butyl-2-benzoxazol-2-yl)thiophene; 2,5-bis(5'-tert-butyl-2'-benzoxazolyl)thiophene; 2,5-bis(5-tert-butyl-2-benzoxazolyl)thiophene; 2,5-bis(5-tert-butyl-benzoxazol-2-yl)thiophene; 2,5-bis(5-tert-butyl-benzoxazoyl)-2-thiophene; 2,5-di(5-tert-butylbenzoxazol-2-yl)thiophene; 2,2'-(2,5-thiophenediyl)bis[5-(1,1-dimethylethyl)-benzoxazole; 2,5-bis(5'-tert-butyl-2-benzoxazolyl)thiophene; and 2,5-thiophenediylbis(5-tert-butyl-1,3-benzoxazole). The absorption of the incident radiation at 375 nanometers caused the excited 2,5-thiophenediylbis(5-tert-butyl-1,3-benzoxazole) optical brightener detectable component to emit radiation at 435 nanometers. The optical brightener was uniformly blended into a PVDC resin which was used to produce an oxygen barrier layer of a multilayer film. Exposing the resulting annular tape and/or heat-shrinkable film tubing to incident radiation at 375 nm excited the 2,5-thiophenediylbis(5-tert-butyl-1,3-benzoxazole) optical brightener detectable component to emit radiation at 435 nanometers. The emitted 435 nm radiation was detected by a machine vision system, which revealed the presence, continuity, and thickness of the PVDC barrier layer of the tape and a multilayer film tubing.

The second aspect is directed to an inspection system. In an embodiment, the inspection system hardware includes: (i) one or more cameras in a camera network (ii) lighting (iii) one or more signal processors (iv) an operator interface (v) an input/output interface (vi) an encoder, and (vii) an industrial computer. In an embodiment, the system configuration can be such that the integration of the camera(s) and electronics does not require a computer on each film production line (or film processing line). Rather, a single server can be used for many lines.

In an embodiment each camera in the camera network communicates digital data to a signal processor residing in the industrial computer where image processing and machine learning algorithms are employed to complete the inspection tasks.

In an embodiment the lighting can be an ultraviolet backlight with software for controlling shutter speed and light intensity. In embodiments in which the process is designed to simultaneously inspect multiple film layers at the same time for the same film, multiple lights can be used with one or more controls for shutter speed and light intensity.

In an embodiment, computer-based signal processors conduct processing tasks such as image segmentation, image de-noising, contrast enhancement, thresholding, and/or pattern recognition. The processing tasks can include feature extraction, feature selection, and/or feature fusion, to achieve defect detection and defect classification. The signal processor(s) can achieve parallel processing tasks.

One embodiment of a machine vision system that can be adapted to carry out the inspection of the moving web is a system marketed by Isra Surface Vision Inc. This system operates at 320 megahertz. With the 4K line-scan color camera, using the standard lens, each scan has 4096 pixels across. Each pixel has a gray scale value of from 0 to 255, with 0 being white, 255 being black, and 1-254 being shades of grey. An alternative embodiment employs a 4K line scan monochrome camera. Using the standard lens with the monochrome camera, each scan has 4096 pixels across.

Not every discontinuity is necessarily in need of detection and reporting. A threshold value can be set so that only defects above the threshold size are flagged for removal. For example, the threshold can be set at a discontinuity or thin region having a size of at least 2 millimeters in at least one direction, i.e., a discontinuity or thin region having a size of at least 2 millimeters in the machine direction and/or at least 2 mm in the transverse direction. Alternatively, the threshold can be set at a size of at least 1 millimeter in at least one direction, i.e., a discontinuity or thin region of at least 1 millimeter in at least one direction. Such a threshold can be set even if the system has the capability to see discontinuities down to a size of as low as 10 microns in at least one direction. The setting of the threshold value is different from the capability of the machine vision system to detect a discontinuity and/or thin region down to at least a particular size in at least one direction. Rather, the setting of the threshold value is the setting of the minimum value of the size of the discontinuities/thin spots which trigger the generation of the signal in response thereto. That threshold can be set at any desired value, and is different from the capability of the machine vision system to detect discontinuities down to at least a specified size.

Figure 8:
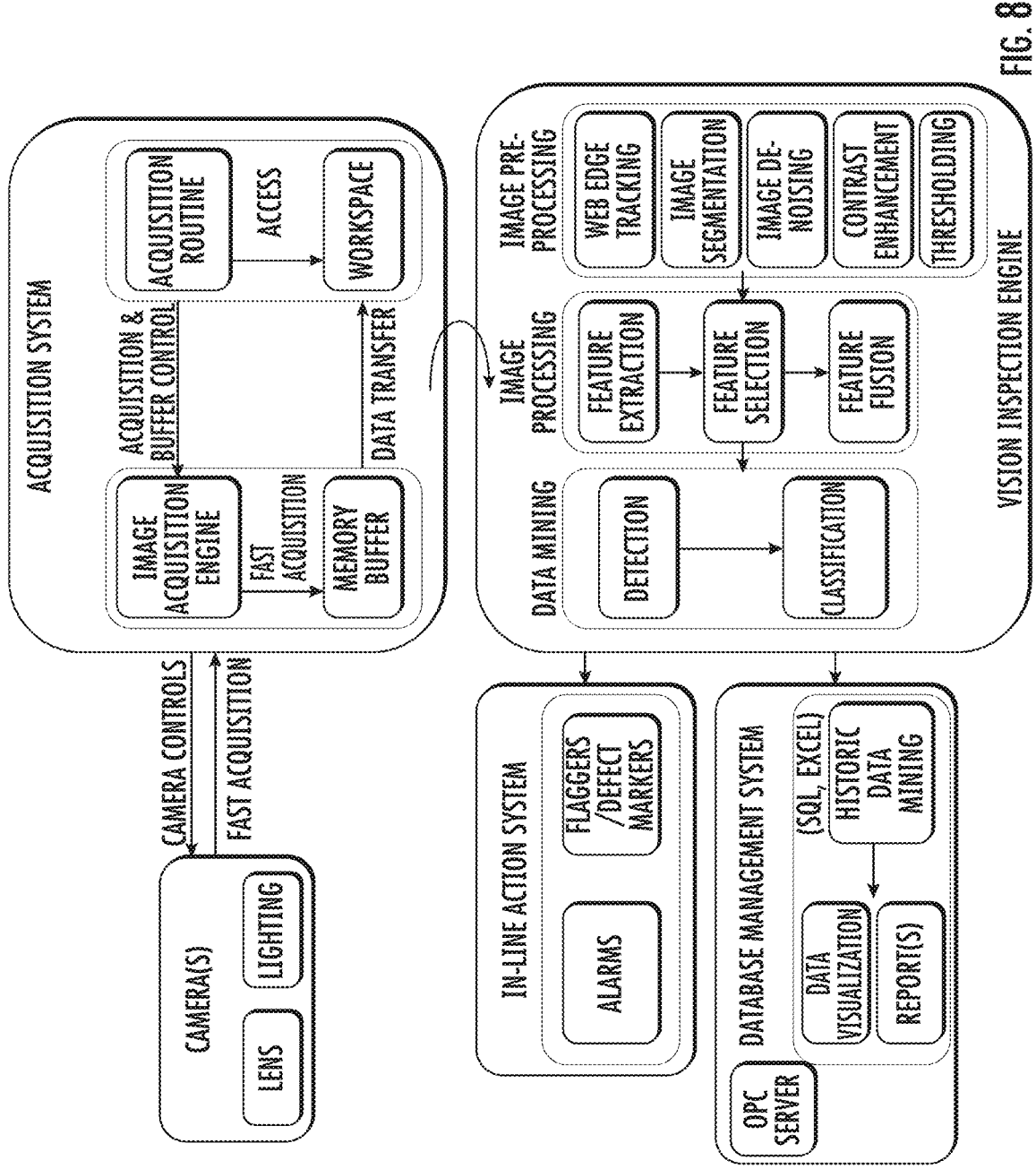
FIG. 8 is a schematic of a system for assessing continuity of a functional layer of a web, including a flow diagram for data acquisition, data processing, and an alert for identifying the presence or absence of a defect in the web.

An embodiment of a vision system design including a data flow diagram for data acquisition and data analysis is set forth in FIG. 8. The vision system design of FIG. 8 includes a data flow diagram including one or more cameras, a data acquisition system, a vision inspection engine, an in-line action system, and a database management system. These components together made up a system which was employed as barrier layer defect detection.

The camera may be a color camera or a monochrome camera. The lighting used with the camera may have adjustable intensity. Although the camera may be an area-scan camera or a line-scan cameral, the line-scan camera is preferred because it produces less data that can be analyzed more quickly. Although the camera may have 4K or 8K pixels per line, 4K is adequate to inspect a flat tape, a flat film, an annular tape, an annular hot-blown film (a non-heat shrinkable film that is oriented at a temperature above the melting point), and/or an annular heat-shrinkable film tubing. Annular tapes and films can be inspected in lay-flat configuration, with the images providing data on the continuity of both lay-flat sides of the tape or film.

Using an appropriate combination of camera head, lighting, and lens configuration, a series of images are acquired and fed into the acquisition system where the data is buffered and transferred to the inspection engine for further processing. A series of signal processing tasks are conducted such as image segmentation, image de-noising, contrast enhancement, thresholding, pattern recognition (including feature extraction, feature selection, and feature fusion), to achieve defect detection and defect classification. The detection results are further fed into an in-line action system to set up pre-determined alarms, film flagging, displaying an image of a discontinuity, displaying data pertaining to one or more discontinuities including displaying data related to geometric characteristics of the discontinuity, location of the discontinuity, degree of occurrence of discontinuities; severity of discontinuities, and/or generating a report of discontinuity data. Data pertaining to discontinuities can be displayed instantaneously and online, or after production is complete, i.e., offline, i.e., not on the fly, the data being accessible in an offline database management system. Using data mining, the data can be manipulated, visualized, and organized into any on-demand report forms desired.

The data processing software was set up to accommodate different concentration levels with minimum need for on-the-fly adjustment of parameters such as exposure time and light intensity. The system was designed to detect discontinuities present as the film was moving in the machine direction, and also to distinguish discontinuities from other defects and contamination.

The film images could be carried out using a 2-D pixel matrix image as captured by an area scan camera or via a 1-D pixel line as captured by a line scan camera. Web Edge Tracking was used to track the edges of the continuous web for the purpose of interest-area selection and image segmentation. Image Segmentation was used to crop the images based on detected web edges and to select the areas of interest. Through image pre-processing, the differentiation between the baseline and the defect(s) was maximized. Different features (e.g., the geometry features, pixel grey scale value thresholds, etc) were extracted, selected and fused into composite features. Using data mining, detection of barrier defects was achieved, together with the classification and separate treatment of other defects and/or contamination located, or the classification and ignoring of other defects and/or contamination.

Two pattern recognition algorithms were utilized to achieve detection in different channels: Dark Feature Detection (dark spots and light spots) and Streak Detection. Dark Feature Detection and Light Feature Detection were based on grey scale value thresholds. Streak Detection was based on geometry features.

Scanning was confined to an area inside the edges of the lay-flat film tubing. Data pertaining to the outer 1-2 millimeters of the film tubing was discarded because the lay-flat film tubing exhibited irregular or regular oscillating lateral movements of about 1 mm as it was being forwarded during production. If scanning was extended to the edge, the oscillating lateral movement would likely have caused false positives in the detection of a discontinuity in the barrier layer.

In an embodiment the operator interface software runs on the industrial computer. Defect data is displayed on the interface and archived in a resident database. Defect data and images are displayed real time on the interface. Instantaneous, historical, and statistical data can be viewed on-demand on the interface. The system can be setup to selectively detect and accurately classify barrier-related film defects such as barrier thin spots or regions, missing barrier, and barrier discontinuities including discontinuity geometric characteristics. Images of each defect can be classified, stored, and displayed. A high-resolution image of each defect can be captured in real time. Discrete defect information such as individual defect geometric information and statistics of group defects can be provided for instantaneous decision-making and actions regarding process improvement and monitoring such as defect alarming. Various outputs for marking/flagging and alarming can be set for different defect severity levels. Data can be exported, for example, to MS Excel and/or a SQL database located anywhere on the network, with data mining software allowing various reports to be easily generated automatically and/or on-demand. Defect data is processed on a processing unit such as a digital processing board. Flagging can be used in conjunction with rewinding the film with one or more defects followed by using slitter to cut out the defects in the film. Flagging can be carried by applying a label to the film at (or corresponding with) the location of the defect in the film. The application of a metal label to the film allows the roll of film to be readily scanned before the roll of film is placed into commerce or used for packaging products or other end use in which the presence of a defect would be detrimental to the objectives to be achieved in the use of the film.

In an embodiment, the standard input/output interface allows for external signal inputs such as new roll indication, web break indication, and pause inspection indication. Outputs for alarms on user-defined defect alarm criteria are also handled through the input/output interface. Outputs can also be initiated to control downstream flagging or marking devices. Alarms can be activated for defects of different pre-defined severities or criteria. Alarm and defect information can be sent via OPC (i.e., software interface standard) to the plant network, programmable logic controller (PLC), or supervisory control and data acquisition/human machine interface (SCADA/HMI).

In an embodiment, the encoder is used to measure the web speed so that the location of a detected defect is ascertainable, particularly down the length of the tape or tubing or flat film being inspected. A series of pulses from the encoder is received by the system and counted. The count is sent to the processor to determine the distance down the web at which the detected defect is located.

Below is information on the identity of various resins and other components present in films of the examples set forth hereinbelow.

SSPE1 was AFFINITY® PL 1281G1 homogeneous ethylene/octene copolymer having a density of 0.900 g/cm$^3$ and a melt index of 6.0 dg/min, obtained from The Dow Chemical Company.

SSPE2 was AFFINITY® PL 1850G homogeneous ethylene/octene copolymer having a density of 0.902 g/cm$^3$ and a melt index of 3.0 dg/min, obtained from The Dow Chemical Company.

SSPE3 was EXCEED® 1012HJ homogeneous ethylene/hexene copolymer having a density of 0.912 g/cm$^3$ and a melt index of 1.0 dg/min, obtained from ExxonMobil.

VLDPE1 was XUS 61520.15L very low density polyethylene having a density of 0.903 g/cm$^3$ and a melt index of 0.5 dg/min, obtained from The Dow Chemical Company.

LLDPE1 was LL 3003.32 heterogeneous ethylene/hexene copolymer having a density of 0.9175 g/cm$^3$ and a melt index of 3.2 dg/min, obtained from Exxon Mobil.

LLDPE2 was DOWLEX® 2045.04 linear low density polyethylene having a density of 0.920 g/cm$^3$ and a melt index of 1.0 dg/min, obtained from The Dow Chemical Company.

LLDPE3 was XUS 61520.21 linear low density polyethylene having a density of 0.903 g/cm$^3$ and a melt index of 0.5 dg/min, obtained from The Dow Chemical Company.

EVA1 was EB524AA ethylene/vinyl acetate copolymer (14% vinyl acetate) having a density of 0.934 g/cm$^3$ and a melt index of 3.5 dg/min, obtained from Westlake Chemical.

EVA2 was ESCORENE® LP761.36 ethylene/vinyl acetate copolymer (26.7% vinyl acetate) having a density of 0.951 g/cm$^3$ and a melt index of 5.75 dg/min, obtained from Exxon Mobil.

EVA3 was 592AA ethylene/vinyl acetate copolymer (10.5% vinyl acetate) having a density of 0.931 g/cm$^3$ and a melt index of 2.0 dg/min, obtained from Westlake Chemical.

PVDC-1 was SARAN® 806 vinylidene chloride/methyl acrylate copolymer having a density of 1.69 g/cm$^3$, obtained from The Dow Chemical Company.

PVDC-2 was IXAN® PV910 vinylidene chloride/methyl acrylate copolymer having a density of 1.71 g/cm$^3$, obtained from Solvin.

OB was BENETEX OB PLUS® 2,5-thiophenediylbis(5-tert-butyl-1,3-benzoxazole fluorescent agent, obtained from Mayzo Inc.

MB 1 was 100458 masterbatch of fluoropolymer in linear low density polyethylene, having a density of 0.93 g/cm$^3$ and a melt index of 2.3 g/10 min, obtained from Ampacet.

MB 2 was IP-1121 masterbatch of fluoropolymer in linear low density polyethylene, having a density of 0.92 g/cm$^3$ and a melt index of 2 g/10 min, obtained from Ingenia Polymers.

Films Nos. 1-6 and Inspection of Film Nos. 1-3

Figure 1B:
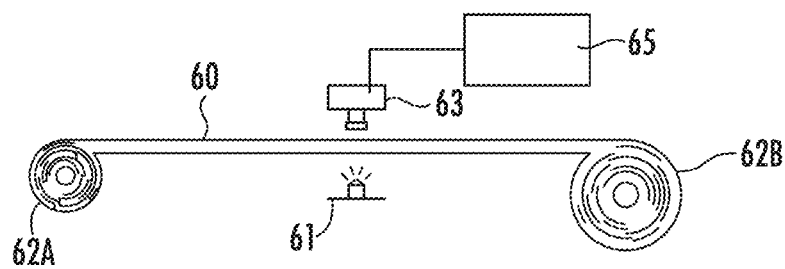
FIG. 1B is a schematic of a process for scanning a web with a machine vision system while the web is being forwarded at a processing speed.
Figure 1C:
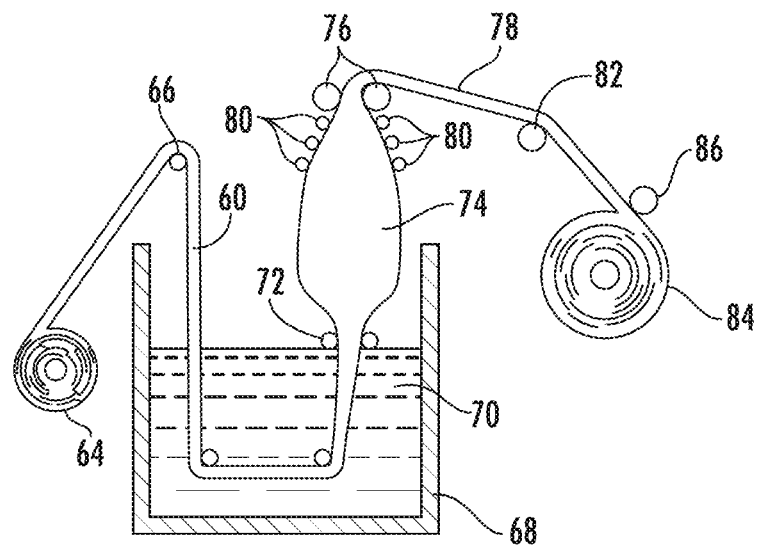
FIG. 1C is a schematic of a further web production process for converting the annular tape produced in FIG. 1A into an annular heat-shrinkable film tubing.

Film Nos. 1 through 6 were prepared and inspected using the processes illustrated in FIGS. 1A, 1B, and 1C. FIGS. 1A and 1C schematically illustrate the process used for making the heat-shrinkable films utilized in the examples herein. FIG. 1B schematically illustrates the laboratory process used for inspecting the oxygen barrier layers for each of the coated annular tapes corresponding with the structures of Film No. 1, No. 2, and No. 3.

In the process illustrated in FIG. 1A, solid polymer beads (not illustrated) were fed to a plurality of extruders 28 (for simplicity, only one extruder is illustrated). Inside extruders 28, the polymer beads were forwarded, melted, and degassed, following which the resulting bubble-free melt was forwarded into die head 30, and extruded through an annular die, resulting in annular tape 32, which was about 15 mils thick.

After cooling and quenching by water spray from cooling ring 34, annular tape 32 was collapsed into lay-flat configuration by nip rollers 36. When collapsed, the annular tape had a lay-flat width of about 2.5 inches. Annular tape 32 in lay-flat configuration then passed through irradiation vault 38 surrounded by shielding 40, where annular tape 32 was irradiated with high energy electrons (i.e., ionizing radiation) from iron core transformer accelerator 42. Annular tape 32 was guided through irradiation vault 38 on rolls 44. Preferably, the irradiation of annular tape 32 was at a level of about 64 kGy.

After irradiation, irradiated annular tape 46 was directed through pre-coating nip rollers 48, following which irradiated annular tape 46 was slightly inflated, resulting in trapped bubble 50. At trapped bubble 50, irradiated annular tape 46 was not significantly drawn longitudinally, as the surface speed of post-coating nip rollers 52 was about the same as the surface speed of pre-coating nip rollers 48. Furthermore, irradiated tape 46 was inflated only enough to place the annular tape into a substantially circular configuration without significant transverse orientation, i.e., without transverse stretching.

Irradiated tape 46, slightly inflated by bubble 50, was passed through vacuum chamber 54, and thereafter forwarded through coating die 56. Annular coating stream 58 was melt extruded from coating die 56 and coated onto inflated, irradiated annular tape 46, to form coated annular tape 60. Coating stream 58 comprised an O$_2$-barrier layer made from PVDC, together with additional layers, all of which did not pass through the ionizing radiation. Further details of the above-described coating step were generally as set forth in U.S. Pat. No. 4,278,738, to BRAX et. al., which is hereby incorporated by reference thereto, in its entirety.

After irradiation and coating, coated annular tape 60, now having a thickness of about 25 mils, was wound up onto windup roll 62. As illustrated in FIG. 1B, removed windup roll 62A of coated annular tape 60 in lay-flat configuration was unrolled, and assessed for continuity of the oxygen barrier layer as it was forwarded at a speed of 400 feet per minute, and re-wound into windup roll 62B. In reality, each of coated annular tapes 60 of Film No. 1, Film No. 2, and Film No. 3 were unrolled in side-by-side configuration and all were assessed for continuity of the oxygen barrier layer at the same time, by the same equipment. Each lay-flat coated annular tape 60 had a width of 2.5 inches. Even though all three coated annular tapes 60 were set up and assessed side-by-side at the same time with the same equipment, FIG. 1B is a schematic illustration of the setup for the assessment of just one of the annular coated tapes.

In FIG. 1B, wound up roll 62A (i.e., windup roll 62 detached from the process illustrated in FIG. 1A) had coated annular tape 60 tape thereon, with coated annular tape 60 being unwound, forwarded over ultraviolet light source 61 and under camera head 63 and rewound as wound up roll 62B. Once unwound from roll 62A, coated annular tape 60 in lay-flat configuration passed over ultraviolet (UV) light source 61 and was impinged from below by incident radiation at 375 nanometers (nm) from UV-light source 61, with the 375 nm radiation exciting the optical brightener in the PVDC layer of the film. At the same moment that coated annular tape 60 received the incident radiation, coated annular tape 60 passed under color line-scan camera head 63 located over coated annular tape 60, in a position directly across and the location at which UV-light source 61 was under annular tape 60. As illustrated in FIG. 1B, vision system color camera head 63 was positioned above lay-flat tape 60 in a position directly over UV-light source 61, and was set to scan across coated lay-flat tape 60 programmed to look only at the blue channel (although the color camera saw red, green and blue divided into 256 discrete colors), i.e., to look only at a wavelength of about 435 nanometers. The camera exposure time was about 100 microseconds, and the camera resolution was 4096 pixels per scan along each scan line, which scan line was in the transverse direction relative to the orientation of the coated film tapes being inspected. The field of view was adjusted to be slightly longer than the transverse distance across all three coated tapes in side-by-side relationship to one another, the tapes being separated from each other by a few millimeters. Images taken from the camera, processed by the signal processors residing in the industrial computer 65, enabled production of a scan signal chart providing an assessment of the continuity of the oxygen barrier layer in coated annular tapes 60.

Thereafter, as illustrated in FIG. 1C, windup roll 62B installed as unwind roll 64, on a second stage in the process of making the desired heat-shrinkable film tubing. Coated annular tape 60 was unwound from unwind roll 64, and passed over guide roll 66, after which coated annular tape 60 was passed into hot water bath tank 68 containing hot water 70. Coated tubular film 60, still in lay-flat configuration, was immersed in hot water 70 (preferably at a temperature of from about 185° F. to 210° F.) for a period of from about 10 to about 100 seconds, i.e., long enough to bring annular tape 60 up to its softening point, i.e., the desired temperature for biaxial orientation while the coated annular tape was in the solid state.

Thereafter, coated annular tape 60 was directed through nip rolls 72, and bubble 74 was blown, thereby transversely solid state stretching coated annular tape 60. Furthermore, while being blown, i.e., transversely stretched, nip rolls 76 drew annular tape 60 in the longitudinal direction, as nip rollers 76 had a surface speed higher than the surface speed of nip rollers 72. As a result of the transverse stretching and longitudinal drawing, annular tape 60 was biaxially oriented in the solid state to form biaxially-oriented, heat-shrinkable film tubing 78. Heat-shrinkable film tubing 78 was stretched transversely at a ratio of 3.6:1, and drawn longitudinally at a ratio of 3.6:1, for a total orientation of about 13×. While bubble 74 was maintained between pairs of nip rollers 72 and 76, the resulting blown film tubing 78 was collapsed into lay-flat configuration by rollers 80. Blown film tubing 78 had a lay-flat width of about 10 inches. Film tubing 78 in lay-flat configuration was thereafter conveyed through nip rollers 76 and across guide roll 82, and then rolled onto wind-up roll 84. Idler roll 86 assures a good wind-up.

Each of Film No. 1 through Film No. 6 was a multilayer heat-shrinkable film having a layer arrangement, layer composition, layer thickness, and layer function as generally set forth in Table 1, below. The seal layer, $1^{st}$ bulk layer, and $1^{st}$ tie layer were all coextruded together and subjected to high energy irradiation in vault 38. The barrier layer, $2^{nd}$ tie layer, $2^{nd}$ bulk layer, and abuse layer were put on in the coating step, i.e., were not irradiated. The heat-shrinkable film tubing made from Films No. 1 through 6 had the following layer arrangement, composition, and thickness:

TABLE 1

| | Layer Film Tubing for Film No. 1, Film No. 2, Film No. 3, Film No. 4, Film No. 5, and Film No. 6 | | | | | | |
|---|---|---|---|---|---|---|---|
| function | Seal | $1^{st}$ Bulk | $1^{st}$ Tie | Barrier | $2^{nd}$ Tie | $2^{nd}$ Bulk | Abuse |
| Composition | 80% SSPE1 20% LLDPE1 | 70% VLDPE1 30% EVA1 | EVA1 | PVDC | EVA2 | 70% VLDPE1 30% EVA1 | 80% SSPE2 20% LLDPE2 |
| wt. % | 21.65 | 38.96 | 4.33 | 9.09 | 4.33 | 12.99 | 8.66 |
| Thickness | 0.43 mil | 0.78 mil | .09 mil | .18 mil | .09 mil | 0.26 mil | 0.17 mil |

Each of Film No. 1 through Film No. 6 contained an oxygen barrier layer composed of the polyvinylidene chloride (PVDC) resin identified above. For each of Film No. 1 through Film No. 6, the PVDC resin was uniformly blended with a detectable component which was an optical brightener. More particularly, Film Nos. 1 through 6 each contained 2,2'-(2,5-(thiophenediyl)-bis(5-tert-butylbenzoxazole)) optical brightener as the detectable component. More particularly, the optical brightener was BENETEX™ optical brightener obtained from Mayzo, Inc of 3935 Lakefield Court, Suwanee, Ga. The optical brightener was blended into the PVDC used to make the oxygen barrier layer for each of Film Nos. 1 through 6, with the blend being made at the following levels: 6.25 ppm (Film No. 1), 12.5 ppm (Film No. 2), 18.75 ppm (Film No. 3), 25 ppm (Film No. 4), 37.5 ppm (Film No. 5), 50 ppm (Film No. 6), with each blend being a uniform blend of the optical brightener with the PVDC. None of the other layers of the film contained any optical brightener, as was also the case for Film Nos. 7 through 10, described below.

Figure 2:
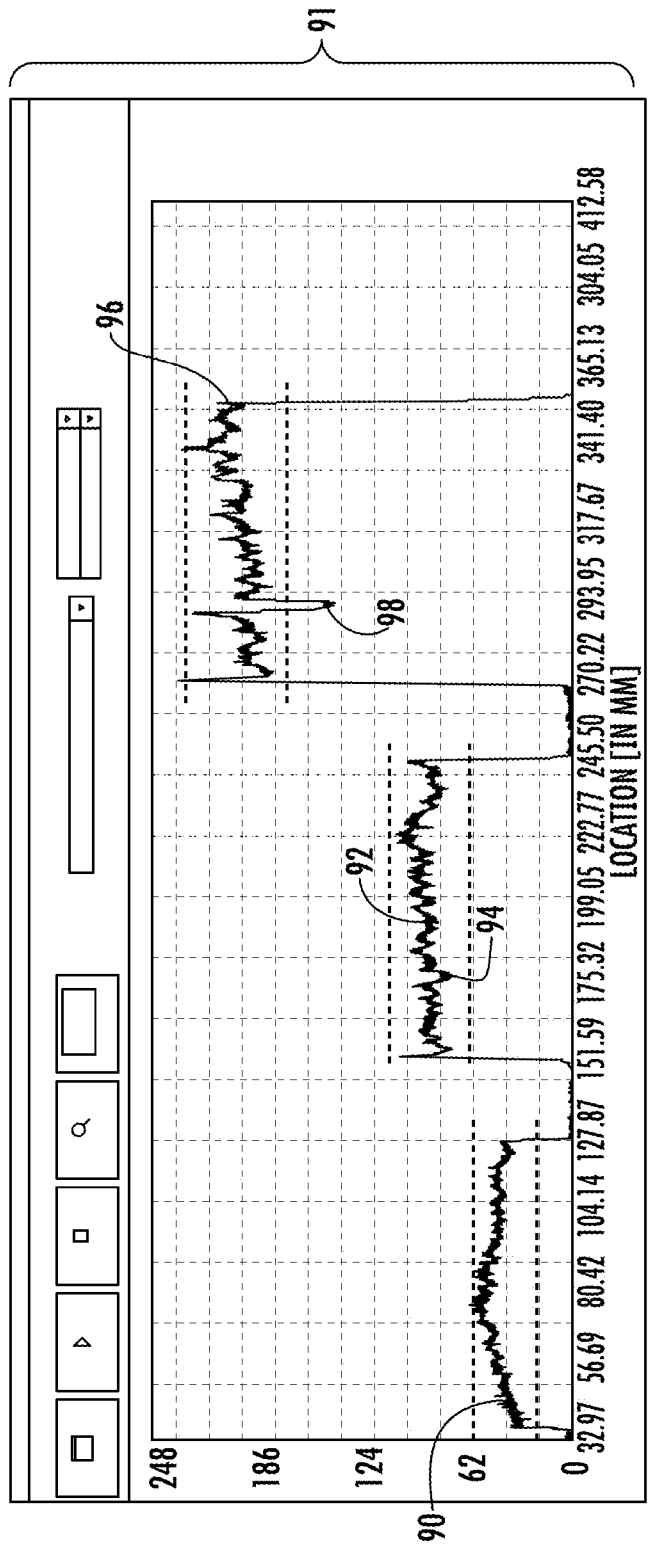
FIG. 2 illustrates both (i) a scan signal charts for coated annular tapes made from Film Nos. 1, 2, and 3 in side-by-side relationship, together with (ii) the corresponding image of the three corresponding lay-flat tapes also in side-by-side relationship.

FIG. 2 illustrates: Top portion 91 illustrating (i) a scan signal chart 90, believed to be the coated annular tape of Film No. 1; (ii) scan signal chart 92, believed to be coated annular tape of Film No. 2; and (iii) scan signal chart 96, believed to be the coated annular tape of Film No. 3. Top portion 91 appears as a single chart because the lay-flat annular tapes of each web were forwarded at about 400 feet per minute while located side-by-side, with a single scan from a single camera going across all three lay-flat coated tapes at the same time. In FIG. 2, top portion 91 shows three samples of filtered detection signal amplitudes in the transverse direction, i.e., scan signal charts of transverse direction scans of the coated annular tapes of Film No. 1, Film No. 2, and Film No. 3 in side-by-side relationship. In FIG. 2, bottom portion 93 shows the corresponding images of the coated annular tapes of Film Nos. 1, 2, and 3, running in the machine direction from top to bottom. It is believed that no scan signal charts were made for Film Nos. 4, 5, and 6.

Each scan signal chart (FIG. 2) was prepared by impinging incident radiation at 375 nanometers from UV-light source 61 (FIG. 1B) located below the three side-by-side annular coated tapes 60 in lay-flat configuration. Radiation from UV-light source 61 excited the optical brightener in the PVDC layer of the film. Vision system color camera head 63 was positioned above lay-flat annular coated tapes 60 in a position directly above UV-light source 61, and was set to scan across the lay-flat coated tapes at the wavelength of 435 nanometers to produce the above-described scan signal charts 90, 92, and 96.

As is apparent from the relationships of the three scan signal charts present in FIG. 2, the annular coated tape of Film No. 1, having an oxygen barrier layer containing 6.25 ppm BENETEX™ optical brightener, exhibited the lowest scan signal intensity. The coated tape of Film No. 2, having an oxygen barrier layer containing 12.5 ppm BENETEX™ optical brightener, exhibited a higher scan signal intensity than Film No. 1, but less scan signal intensity than that of the coated tape of Film No. 3, which had an oxygen barrier layer containing 18.75 ppm BENETEX™ optical brightener.

In FIG. 2, the relatively uniform scan signal 90 indicates that the oxygen barrier layer of coated tape of Film No. 1 had no detected discontinuities in the barrier layer. The scan was taken across the coated tape in lay-flat configuration, i.e., the scan was taken in the transverse direction relative to the direction of tape extrusion (as was the case for all of the scans taken for tapes and webs of Film Nos. 2-10, described below). This is apparent from scan signal 90 because no portion of scan signal 90 exceeded a predetermined threshold value corresponding with a discontinuity or void, or any region of the barrier layer exhibiting excessive thinning of desired layer thickness. In order to detect discontinuities in the barrier layer or areas of excessive thinning in the barrier layer, the threshold value must be set at a level greater than the noise level associated with the scan. Although threshold level can be set at any desired level, unless the signal deviates substantially from the noise level, no discontinuity or excessively thin region is detected. The signal spikes corresponding with the film edges were differentiated from spikes corresponding with layer discontinuities by machine learning algorithms which can be readily developed by those of skill in the computer programming art.

Scan signal 92 of Film No 2 appeared to be within the predetermined threshold value over a majority of the area inspected, but had a small portion which could be deemed to exhibit an out-of-threshold signal valley 94 (the phrase "signal valley" refers to a dip in the signal amplitude in the scan chart) corresponding with a thinning or discontinuity at a particular location of the barrier layer in Film No. 2. However, the deviation from the noise level at signal valley 94 was so small (i.e., signal-to-noise ratio was so low) that it was difficult to determine whether a discontinuity existed outside of the normal noise level. It is believed that the lack of ability to positively assess the signal deviation as a discontinuity (or thick or thin region) was due to the relatively low level of the detectable component in the barrier layer of the annular tape of Film No. 2. However, in fact signal valley 94 was present because the die used to extrude the coating onto the uncoated annular tape of Film No. 2 was modified by insertion of a blockage that produced die line 97 in image 95 of the coated tape of Film No. 2, as shown in the bottom middle of FIG. 2. Whether this resulted in a thin region or a complete discontinuity was not assessed.

Scan signal 96 of Film No 3 was also within the predetermined threshold value over a majority of the area inspected, but exhibited one out-of-threshold signal region 98 (i.e., a signal valley) caused by a layer discontinuity corresponding with a die line in the barrier layer. It is apparent in scan signal 96 that the signal valley at signal region 98 was large enough to reveal the discontinuity formed by the die line. The signal valley was larger in scan signal 96 than in scan signal 92 due to the higher level of indicator component in the barrier layer of Film No. 3 vs. Film No. 2. Thus, the level of the indicator component in the barrier layer affects the ability to detect a signal valley outside of the noise level, the valley indicating a discontinuity or thin region of the barrier layer of the film.

That scan signal 90 taken across coated annular tape of Film No. 1 exhibited no apparent discontinuity in the barrier layer was consistent with the fact that the die used to extrude the coating onto the uncoated annular tape of the Film No. 1 was not modified by the insertion of a blockage that produced a die line in the barrier layer. The lack of a die line is consistent with the lack of any apparent die line in image 91 of the coated tape of Film No. 1 at the bottom of FIG. 2.

Scan signal 92 of the barrier layer of the coated annular tape of Film No. 2 exhibited signal valley 94 (the phrase "signal valley" refers to a dip in the signal amplitude in the scan chart) representing a discontinuity in the barrier layer. In fact, signal valley 93 was present because the die used to extrude the coating onto the uncoated annular tape of Film No. 2 was modified by insertion of a blockage that produced die line 97 in image 95 of the coated tape of Film No. 2, as shown in the bottom middle of FIG. 2.

Scan signal 96 of the barrier layer of the coated annular tape of Film No. 3 exhibited signal valley 98 representing a discontinuity in the barrier layer of the coated annular tape of Film No. 3. Signal valley 98 was present because the die used to extrude the coating onto the uncoated annular tape of Film No. 3 was also modified by insertion of a blockage that produced die line 100 in image 99 of the coated tape of Film No. 3, as shown in the bottom right image in FIG. 2.

Although the scan charts of Film No. 1 and Film No. 2 were of barrier layers containing 6.25 ppm and 12.5 ppm of the optical brightener detectable component, the camera settings were not optimized to reveal signal valleys. With optimization of the camera settings, detectable component levels from 2 to 5 ppm are believed to be capable of clearly revealing signal valleys indicative of discontinuities in the barrier layer.

Film No. 7. Film No. 8, and Film No. 9

Film No. 7, Film No. 8, and Film No. 9 were multilayer heat-shrinkable films made and inspected in accordance with the process illustrated in FIGS. 1A, 1B, and 1C, described above. The resulting heat-shrinkable film tubing of each of Film Nos. 7, 8, and 9 had a layer arrangement, layer composition, layer thickness, and layer function as follows:

| | Film No. 7 and Film No. 8 | | | |
|---|---|---|---|---|
| Layer function | Seal | Bulk | Barrier | Abuse |
| Layer Composition wt. % | 60% SSPE1 40% LLDPE1 14 | 70% VLDPE1 30% EVA1 51.4 | PVDC 10.3 | 85% EVA3 15% LLDPE2 24.3 |
| Thickness | 0.28 mil | 1.03 mil | 0.21 mil | .49 mil |

Film No. 7 was made without any optical brightener in the PVDC layer. Film No. 8 was made with a PVDC layer containing BENETEX™ optical brightener a level of 5.44 ppm. Film No. 9 was made with a PVDC layer containing BENETEX™ optical brightener at a level of 8.38 ppm.

Figure 3:
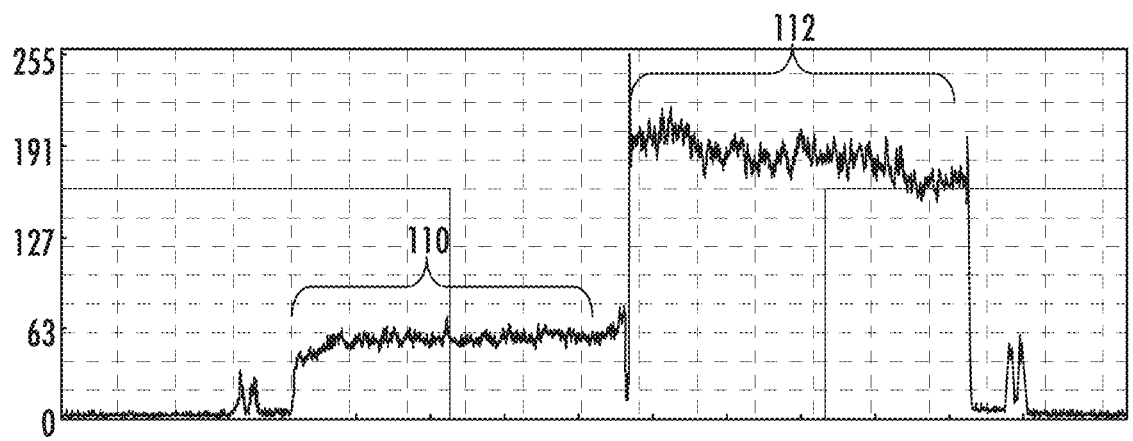
FIG. 3 illustrates transverse scan signal charts for coated annular tapes made from Film Nos. 7 and 8 in side-by-side relationship.

FIG. 3 includes scan signal 110 of the coated annular tape of Film No. 7, which contained no optical brightener. The annular tape was in its lay-flat configuration. The inspection of Film No. 7 was carried out as described for Film Nos. 1, 2, and 3, except that the camera was a monochrome line scan camera rather than a color line scan camera. Otherwise, the camera specifications were the same as described above for the evaluation of Film Nos. 1, 2, and 3. As is apparent from scan signal 110, even with no optical brightener present, the film exhibited a 435 nm emission intensity level of about 60 (a unitless figure on a relative scale). It is believed that the positive level of emission intensity was due to ambient light reflected into the line scan camera head. Although the scan signal intensity across Film No. 7 did not indicate any discontinuity in the barrier layer, if there had been a discontinuity it should not have been revealed by a valley in the scan signal amplitude because the scan signal amplitude was not generated by the fluorescence of the optical brightener, as the optical brightener was not present in Film No. 7.

FIG. 3 also includes scan signal 112 of coated annular tape of Film No. 8, which contained the optical brightener in the PVDC barrier layer at a level of 5.44 ppm. The annular tape made from Film No. 8, in lay-flat configuration, was inspected with the same equipment, in the same manner, and at the same time Film No. 7 was inspected, i.e., Film No. 8 was scanned in side-by-side with Film No. 7. As is apparent from scan signal 112, Film No. 8 exhibited a 435 nm emission intensity level of about 190 (again, a unitless figure on a relative scale). Scan signal 112 did not exhibit any valley in the signal amplitude, indicating no discontinuity in the scan across the annular tape in lay-flat configuration. No blockage had been placed in the barrier layer slot in the coating die, contrary to the blockage placed in the barrier layer slot of the coating die in the making of Film No. 2 and Film No. 3, described above.

Figure 4:
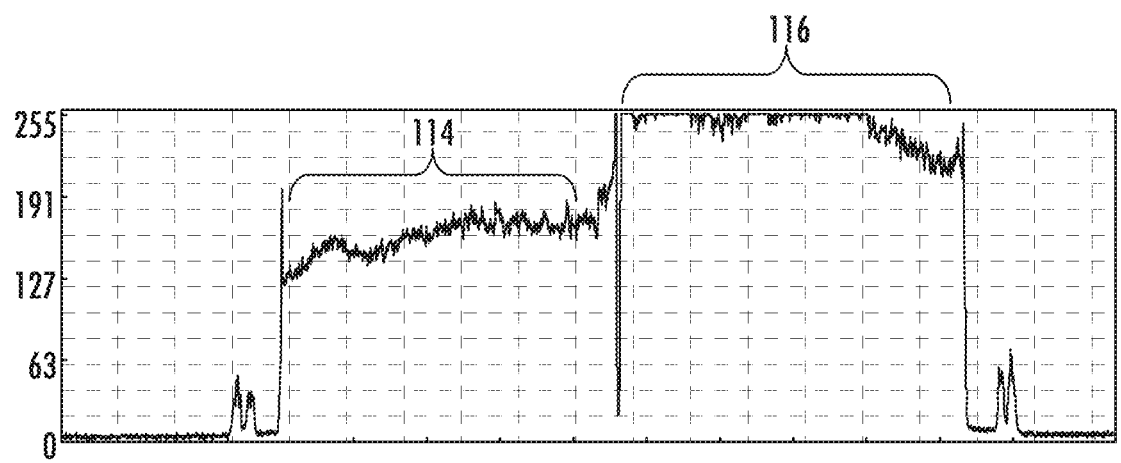
FIG. 4 illustrates scan signal charts for coated annular tapes made from Film Nos. 8 and 9 in side-by-side relationship.

FIG. 4 illustrates scan signal 114 of Film No. 8, and scan signal 116 of Film No. 9. As can be seen in FIG. 4, the scan signal of Film No. 9 had a higher intensity (about 250 units on the unitless scale, with a majority of the scan signal reaching saturation of the scale at 255 units) than the scan signal of Film No. 8. The higher scan signal amplitude of Film No. 9 was due to the higher level of optical brightener in Film No. 9 compared with Film No. 8, i.e., the barrier layer of Film No. 9 contained 8.38 ppm optical brightener whereas the barrier layer of Film No. 8 contained only 5.44 ppm optical brightener. As with the scan signal 114 of Film No. 8, the scan signal of Film No. 9 did not exhibit any valley in the signal amplitude, indicating no discontinuity in the scan across the annular tape of Film No. 9, which annular tape was in its lay-flat configuration. As with Film No. 8, no blockage had been placed in the barrier layer slot in the coating die used to make Film No. 9, contrary to the blockage placed in the barrier layer slot of the coating die in the making of Film No. 2 and Film No. 3, described above.

Film No. 10

Film No. 10 was a multilayer heat-shrinkable film made and inspected in accordance with the process illustrated in FIGS. 1A, 1B, and 1C, described above. Moreover, the layer arrangement and layer composition was the same as set forth in Table 1, above. The barrier layer of Film No. 10 contained 4.41 ppm BENETEX™ optical brightener blended with the PVDC polymer. The barrier layer slot in the annular coating die was partially blocked with three artificial blockages in order to cause the coating die to extrude a PVDC oxygen barrier layer having three die lines therein. Two of the artificial die blockages were placed so that the resulting die lines would coincide or overlap each other when the tape was in the lay-flat configuration. The third artificial die blockage was placed to fall in one lay-flat side of the lay-flat annular tape. In this manner, the scan of the annular tape in lay-flat configuration would show the effects of overlapping and non-overlapping discontinuities in the barrier layer.

Figure 5A:
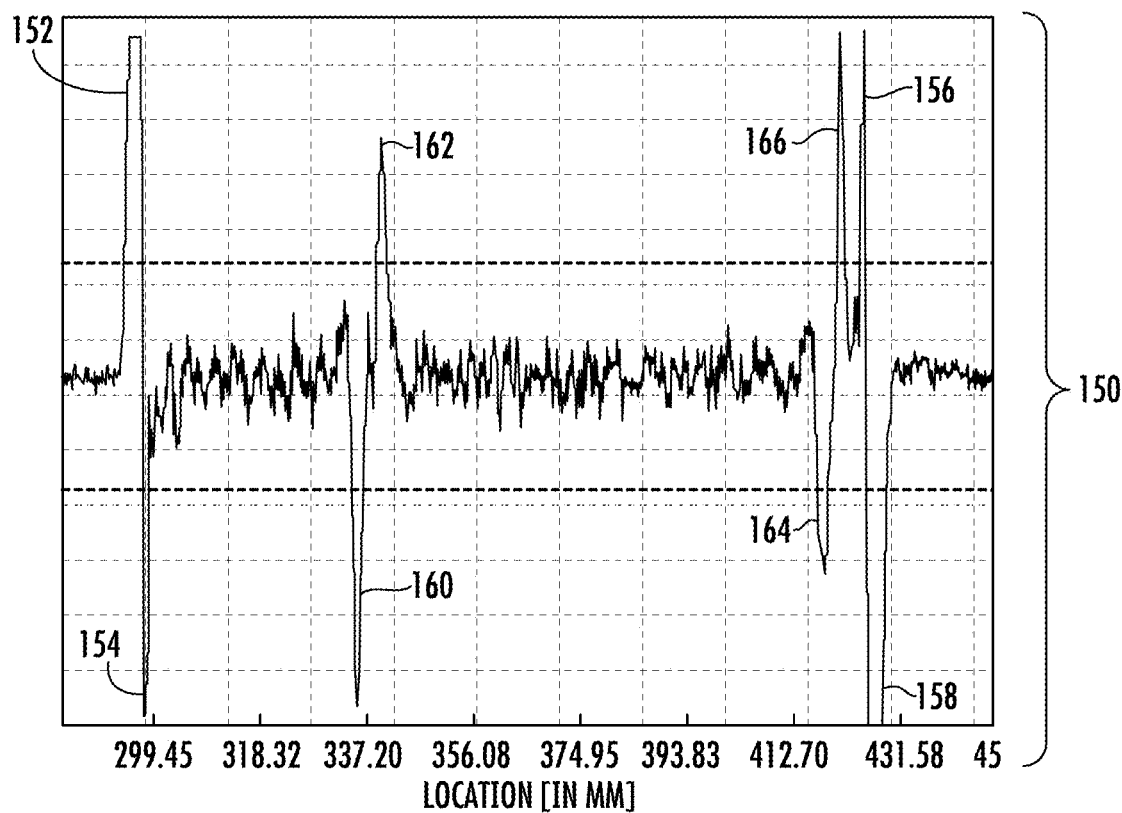
FIG. 5A illustrates a scan signal chart for a coated annular tape made from Film No. 10, the scan being taken with the first lay-flat side up.
Figure 5B:
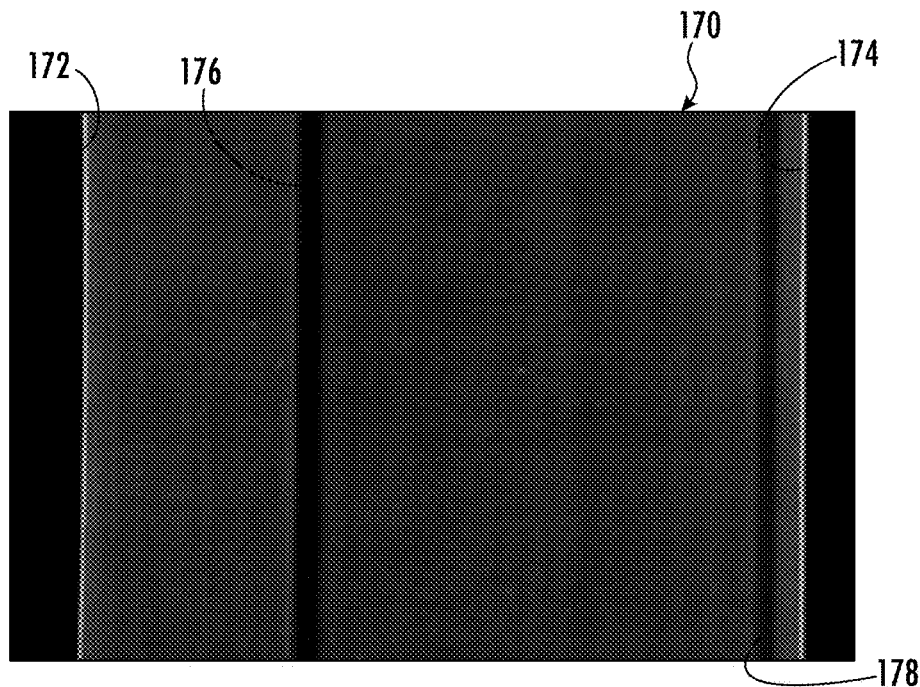
FIG. 5B is an image of the scanned section of the coated annular tape of Film No. 10, the image being taken with the first lay-flat side up.

FIG. 5A is a scan chart 150 of a scan taken across (i.e., in the transverse direction) lay-flat coated annular tape 170 of Film No. 10 using the same 4 k line-scan monochrome camera used to scan Film Nos. 7-9. FIG. 5B is an image of the scanned portion of the coated annular tape 170 of Film No. 10, with annular tape 170 being in lay-flat configuration. Both the scan chart of FIG. 5A and tape image of FIG. 5B were taken while the coated annular tape was in its lay-flat configuration, with a first lay-flat side up and a second lay-flat side down, with the image of the coated annular tape in FIG. 5B being taken while the coated annular tape was being illuminated with infrared radiation having a wavelength of 375 nanometers causing the optical brightener to fluoresce radiation at 435 nanometers.

FIGS. 5A and 5B were vertically aligned with respect to each other, in that the image of left edge 172 of lay-flat tape 170 of FIG. 5B is illustrated so that it is aligned with the negative gradient between left edge amplitude peak 152 and left edge amplitude valley 154 of the scan signal of FIG. 5A. Moreover, the image of right edge 174 of lay-flat tape 170 of FIG. 5B is aligned with the negative gradient between right edge amplitude peak 156 and right edge amplitude valley 158 of the scan signal of FIG. 5A. Furthermore, first die line 176 in lay-flat tape 170 of FIG. 5B is aligned with the positive gradient between first die line amplitude valley 160 and first die line amplitude peak 162 in scan chart 150. Finally, second die line 178 in lay-flat tape 170 of FIG. 5B is aligned with the positive gradient between second die line amplitude valley 164 and second die line amplitude peak 166 in scan chart 150. In FIG. 5A, the negative gradient of the scan signals representing the tape edges, as well as the positive gradient of the scan signals representing die lines 176 and 178, were a product of the data processing algorithm applied to generate the scan chart.

Figure 6:
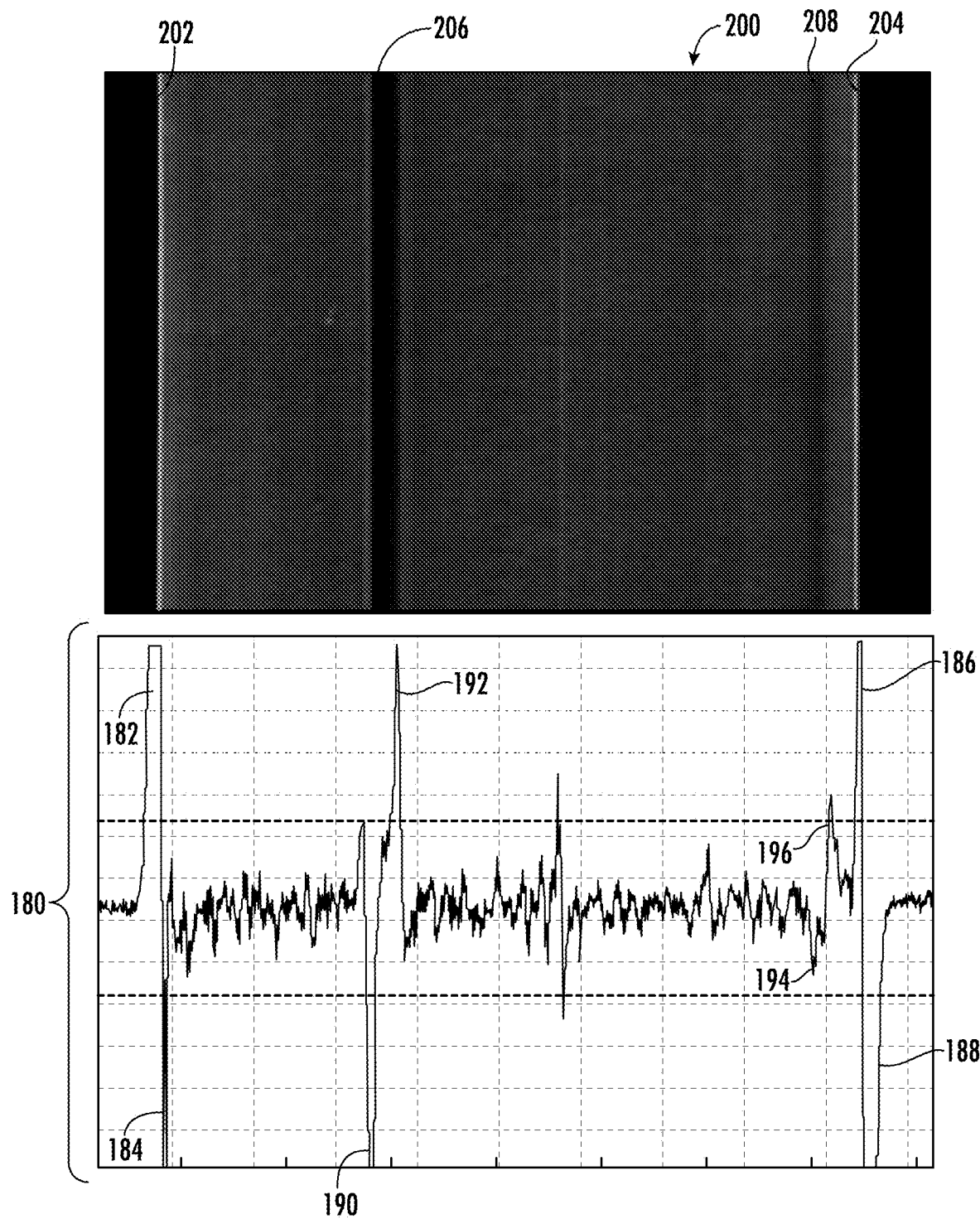
FIG. 6 both illustrates a scan signal chart for the coated annular tape made from Film No. 10, the scan being taken with the second lay-flat side up, and above the scan an image of the coated annular tape of Film No. 10, the image being taken with the second lay-flat side up.

FIG. 6 includes scan chart 180 of a scan taken across lay-flat coated annular tape 200 of Film No. 10 using the same 4 k line-scan monochrome camera used to produce the scan chart in FIG. 5A and the same camera used to take the image of the tape of FIG. 5B. In FIG. 6, scan chart 180 is of the same section of Film No. 10 scanned in FIG. 5A and illustrated in FIG. 5B, except in FIG. 6 annular tape 200 was flipped end-to-end, i.e., was placed in lay-flat configuration with its second lay-flat side up and its first lay-flat side down. The FIG. 6 image of coated annular tape 200 in lay-flat configuration was taken while the coated annular tape was being illuminated with infrared radiation having a wavelength of 375 nanometers causing the optical brightener in the oxygen barrier layer to fluoresce radiation at 435 nanometers.

In FIG. 6, scan chart 180 is vertically aligned with annular tape 200, in that the image of left edge 202 of lay-flat tape 200 is illustrated so that it is aligned with the negative gradient between left edge amplitude peak 182 and left edge amplitude valley 184 of scan signal 180. Moreover, the image of right edge 204 of lay-flat tape 200 of FIG. 6 is aligned with the negative gradient between right edge amplitude peak 186 and right edge amplitude valley 188 of scan signal 180. Furthermore, first die line 206 in lay-flat tape 200 is aligned with the positive gradient between first die line amplitude valley 190 and first die line amplitude peak 192 in scan chart 180. Finally, second die line 208 in lay-flat tape 200 is aligned with the positive gradient between second die line amplitude valley 194 and second die line amplitude peak 196 in scan chart 180. As with FIG. 5A, in FIG. 6 the negative gradient of the scan signals representing the tape edges 202 and 204, and the positive gradient of the scan signals representing die lines 206 and 208, were a product of the data processing algorithm applied to generate scan chart 180.

A comparison of the images of coated annular tape 170 of FIG. 5B having first lay-flat side up, and coated annular tape 200 of FIG. 6 having second lay-flat side up, i.e., the same section of annular tape but with reversed lay-flat sides up, reveals that (i) the scan signal amplitude of valley 164 and peak 166 of the scan signal corresponding with second die line 178 in FIG. 5B are of greater amplitude than (ii) the scan signal amplitude of valley 194 and peak 196 of the scan signal corresponding with second die line 208 of FIG. 6. The higher amplitude of scan signal valley 164 and peak 166 in FIG. 5A vs. the corresponding scan signal valley 194 and peak 196 of second die line 208 of FIG. 6 is believed to be due to second die line 178 being in the first lay-flat side of the coated annular tape, where in FIG. 5B second die line 178 was viewed directly by the camera without being partially masked by the second lay-flat side of the tape, as was second die line 208 in FIG. 6. It is believed that even though second die line 178 in FIG. 5B was the same die line as die line 208 in FIG. 6, establishing that the machine vision scan was able to detect the presence of the die lines in both lay-flat side of the annular tape, regardless of which lay-flat side the die line was in.

As to the first die line 176 in FIG. 5B and the first die line 206 in FIG. 6, a comparison of the darkness intensity of die lines 176 and 206 shows that they are relatively similar in darkness intensity. It is believed that the images of die lines 176 and 206 and their associated scans represented the two overlapping/coinciding die lines produced by two of the artificially placed die blockages in the barrier layer die slot. The similarity of appearance of the overlapping/coinciding die lines 176 in tapes 170 and 200 shows that discontinuities that are superimposed over each other in the lay-flat sides of the annular tape will have a darker appearance when viewed from both sides, unlike the marked difference in appearance and signal intensity of second die line 178 (and signal valley 164 and signal peak 166) of FIGS. 5A and 5B, versus second die line 208 (and signal valley 194 and signal peak 196) of FIG. 6.

Scan signal 180 in FIG. 6 also exhibited a negative gradient between scan signal amplitude peak 198 and scan signal amplitude valley 199. This peak and valley appeared to correspond with a portion of the barrier layer containing a higher level of the optical brightener, believed to be due to a thickened region of the barrier layer. Based on the machine direction orientation of the thickened region of the barrier layer in FIG. 6, it is believed that this thickened region may also be based on an anomaly in the barrier layer slot of the extrusion die.

Figure 7A:
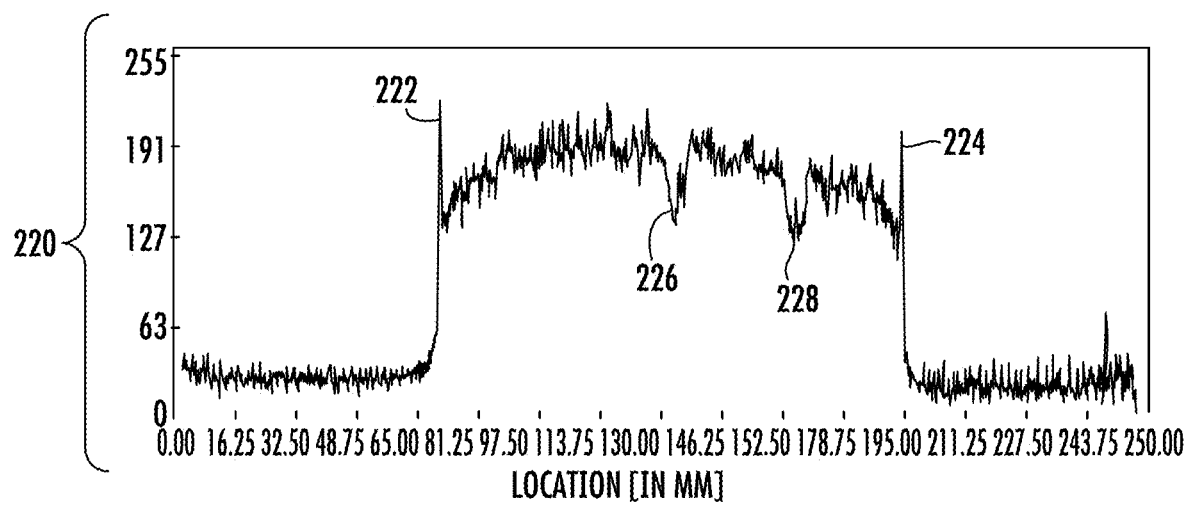
FIG. 7A illustrates a scan signal chart for the annular heat-shrinkable film made from Film No. 10, the scan being taken with the first lay-flat side up.
Figure 7B:
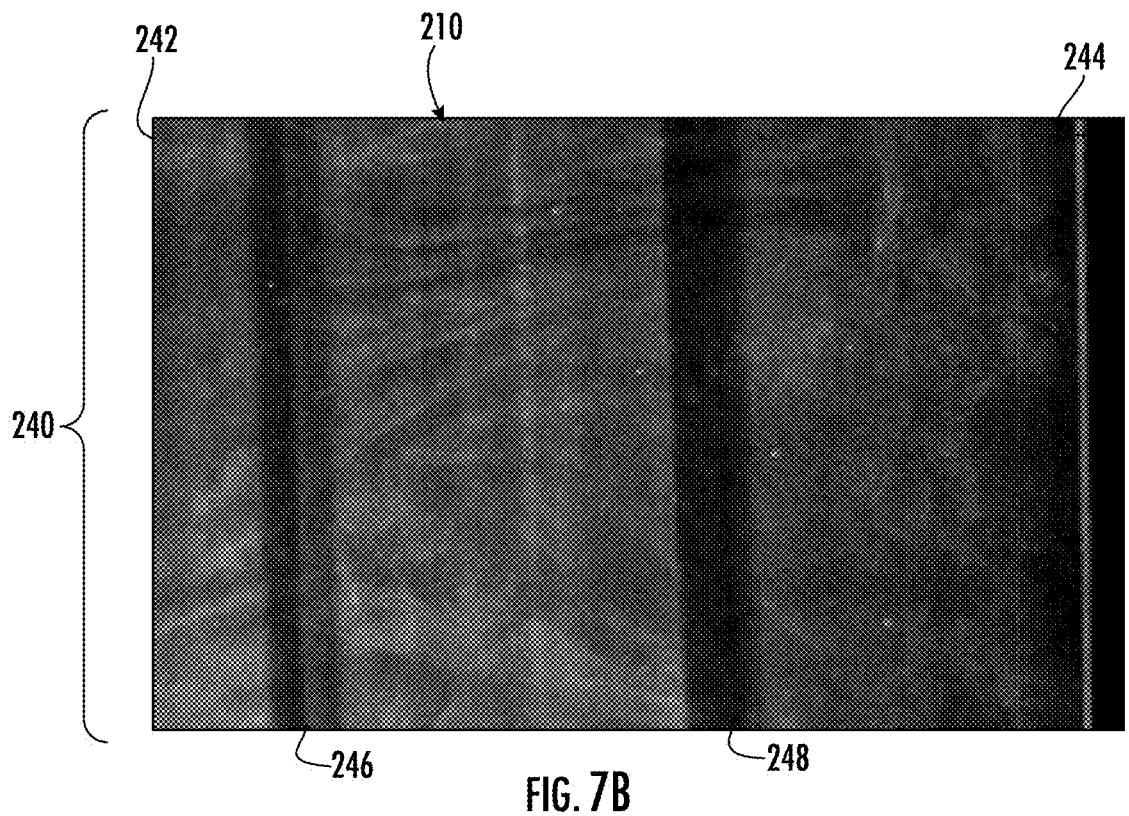
FIG. 7B is an image of a portion of the scanned section of the annular heat-shrinkable film made from Film No. 10, the image being taken with the first lay-flat side up.

FIG. 7A is a scan chart 220 of a scan taken across (i.e., in the transverse direction) a portion of the lay-flat heat-shrinkable annular film tubing section 240 illustrated in FIG. 7B, which annular film tubing section 210 was made from the annular tape illustrated in FIGS. 5B and 6, which tape was made from Film No. 10. The heat-shrinkable annular film tubing section 240 in lay-flat configuration was the result of further processing the lay-flat annular tape 170 via the process of FIG. 1C, to produce lay-flat heat-shrinkable annular film tubing 240.

FIG. 7B is an image of the scanned portion of lay-flat heat-shrinkable annular film tubing 240 of Film No. 10, in lay-flat configuration. Both the scan chart of FIG. 7A and tape image of FIG. 7B were taken while the portion of the coated annular tape was in its lay-flat configuration, with a first lay-flat side up and a second lay-flat side down. The image of the heat-shrinkable annular film tubing 240 of FIG. 7B was taken while the heat-shrinkable annular film tubing was illuminated with infrared radiation having a wavelength of 375 nanometers, causing the optical brightener to fluoresce radiation at 435 nanometers.

Scan chart 220 of the lay-flat heat-shrinkable annular film tubing 240 was produced using the same 4 k line-scan monochrome camera used to scan and photograph Film No. 10 in FIGS. 5A and 6. Moreover, the same camera used to take the images of lay-flat annular tapes 170 and 200 of FIGS. 5B and 6 was used to take the image of heat-shrinkable annular film tubing section 240 of FIG. 7B.

Although heat-shrinkable annular film tubing 240 of FIG. 7B was the same heat-shrinkable annular film tubing the scan of which resulted in scan chart 220 of FIG. 7A, the lay-flat film tubing edges represented by left edge peak 222 and right edge peak 224 of scan chart 220 do not line up with the left edge 242 or the right edge 244 of film tubing section 240 of FIG. 7B, because the image illustrated in FIG. 7B does not show the entire width of the heat-shrinkable annular film tubing produced. However, scan chart 220 of FIG. 7A contains first signal valleys 226 and 228 which are believed to correspond with die lines 246 and 248, respectively, of FIG. 7B. Furthermore, signal valley 226 has a shoulder that may correspond with the apparent double (overlapping) die lines designated as die line 226 in FIG. 7B, which may be in opposite lay-flat sides of heat-shrinkable annular film tubing section 240. Thus, the process can locate die lines in both the annular tape 170 of FIG. 5B as well as in the heat-shrinkable annular film tubing 240 of FIG. 7B.

Although it may be surmised that the die lines 246 and 248 in heat-shrinkable annular film tubing 240 should correspond with the die lines in annular tape 170 and 200 (because film tubing 240 was made from the same annular tape represented by annular tapes 170 and 200), it is believed that the orientation of the tape in the process illustrated in FIG. 1C (described above) may interfere with the ability to correlate the die lines in the annular tape with the die lines in the resulting heat-shrinkable annular film tubing.

Film No. 11 and Film No. 12

The evaluation of the degree of continuity in the barrier layer in each of Film No. 1 through Film No. 10 was conducted in a laboratory setting, using pre-made film samples. These film samples were moved at a speed of only 1 foot per minute relative to the fixed position of the machine vision system.

In contrast, Film No. 11 and Film No. 12 were prepared and evaluated in-line on a production process for the making of the film, with the film moving at a speed in excess of 150 feet per minute relative to the fixed position of the machine vision system, with the run being carried out for a period of 2 hours for each film. The single-point UV sensor (SMART RGB Digital Sensor Reflective, UV-head, model CZ-H52, and SMART RGB Digital Sensor Amplifier Main Unit PNP, model CZ-V21AP, obtained from Keyence Corporation of America) was mounted underneath the vision system (Industrial Rack Mount PC with Windows 10 OS, PC enclosure, ISRA "SMASH" Web Processing Board, 320 MHz 4096 Pixel Camera, Camera Cable, Keyboard, Monitor, Camera Lens 50 mm f 1.2, LED light line (UV) 10 inch, Rotary Encoder with Cable and Mounting Bracket, ISRA "CENTRAL" Web Inspection Software and License, obtained from ISRA Surface Vision) to monitor the UV level fluctuation. The uv level fluctuation was not high enough to generate false positives. Software benchmarks were composed for high dose (Film No. 11 had approximately 45 ppm indicator based on barrier layer weight) and low dose (Film No. 12 had approximately 15 ppm based on barrier layer weight). All other parameters were the same with high dose and low dose except for the exposure time.

The layer arrangement, layer composition, layer function, and layer thickness for Film No. 11 were as follows:

Film No. 11

| | Layer Film Tubing of Film No. 11 | | | | | | | |
|---|---|---|---|---|---|---|---|---|
| function | Seal | 1$^{st}$ Bulk | 2$^{nd}$ Bulk | 1$^{st}$ Tie | Barrier | 2$^{nd}$ Tie | 3$^{rd}$ Bulk | Abuse |
| Composition | 80% SSPE1 20% LLDPE1 | 80% VLDPE1 19% SSPE3 1% MB-1 | 100% EVA1 | 100% EVA2 | PVDC-2 containing 45 ppm OB | 100% EVA2 | 80% VLDPE1 19% SSPE3 1% MB1 | 80% SSPE2 19% LLDPE2 1% MB-2 |
| wt. % | 19.6 | 45.2 | 4.1 | 2.7 | 8.2 | 2.7 | 9.6 | 7.8 |
| Thickness | 0.43 mil | 0.99 mil | 0.09 mil | 0.06 mil | 0.18 mil | 0.06 mil | 0.21 mil | 0.17 mil |

The layer arrangement, layer composition, layer function, and layer thickness for the film tubing of Film No. 12 were as follows:

Film No. 12

| | Layer Film Tubing of Film No. 12 | | | | | | | |
|---|---|---|---|---|---|---|---|---|
| function | Seal | 1$^{st}$ Bulk | 2$^{nd}$ Bulk | 1$^{st}$ Tie | Barrier | 2$^{nd}$ Tie | 3$^{rd}$ Bulk | Abuse |
| Composition | 80% SSPE1 20% LLDPE1 | 80% VLDPE1 19% SSPE3 1% MB-1 | 100% EVA1 | 100% EVA2 | PVDC-2 containing 15 ppm OB | 100% EVA2 | 80% VLDPE1 19% SSPE3 1% MB1 | 80% SSPE2 19% LLDPE2 1% MB-2 |
| wt. % | 19.6 | 45.2 | 4.1 | 2.7 | 8.2 | 2.7 | 9.6 | 7.8 |
| Thickness | 0.43 mil | 0.99 mil | 0.09 mil | 0.06 mil | 0.18 mil | 0.06 mil | 0.21 mil | 0.17 mil |

The barrier layer formulations for each of Film No. 11 and Film No. 12 were provided with an indicator which was BENETEX OB PLUS® benzoxazole-2,5-thiophenediylbis (5-tert-butyl-1,3-benzoxazole. Although this material has been used as a brightening agent to reduce the appearance of the browning of PVDC during film extrusion, benzoxazole-2,5-thiophenediylbis(5-tert-butyl-1,3-benzoxazole also acts as a fluorescent agent when subject to incident radiation at 375 nm. Upon excitement by exposure to radiation having at peak wavelength of 375 nm, the indicator fluoresced at peak wavelength of 435 nm. Film No. 11 had a barrier layer with an OB level of 45 ppm. Film No. 12 had a barrier layer with an OB level of 15 ppm.

In the evaluation of Film No. 11 and Film No. 12, the machine vision evaluation was carried out on a line moving in excess of 150 feet per minute. Although the machine vision system was able to detect a discontinuity down to below 0.1 mm, the minimum discontinuity level reported was 0.1 mm.

In order to provide barrier layer discontinuities in the films for the test runs, the extrusion of Film No. 11 and Film No. 12 included blocking four locations on the PVDC extrusion coating die, in order to generate discontinuities in the PVDC layer that simulated a solid particle becoming lodged in the die gap. The PVDC layer portion of the die stack allowed a molten stream of PVDC/indicator blend to emerge from the die. The four blockages caused four discontinuities in the PVDC layer. The four discontinuities ran continuously in the machine direction in the PVDC layer. The four discontinuities appeared as continuous streaks running in the machine direction in the PVDC layer of the film produced using the die.

Figure 9:
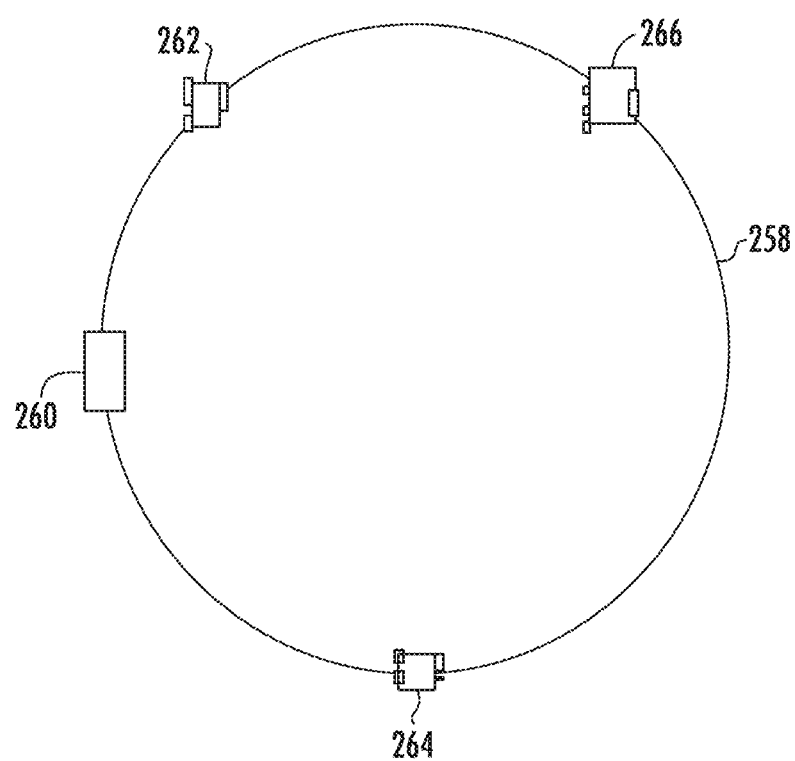
FIG. 9 is a schematic of a portion of a coextrusion die having four blockages therein.

A schematic of single section 258 of an annular multilayer coating die with four blockages installed therein is illustrated in FIG. 9. The four die blockages illustrated in FIG. 9 include first blockage 260 which had a width of 0.5 inch, second blockage 262 which had a width of 0.0625 inch, third blockage 264 which had a width of 0.125 inch, and fourth blockage 266 which had width of width of 0.25 inch. The four discontinuities were confined to the PVDC layer of the extrusion coating die. Microscopy of the final film revealed that the four streaks had widths of about 4.1 mil (about 0.1 mm), 18.9 mil (about 0.5 mm), 19.5 mil (about 0.5 mm), and 27.7 mil (about 0.7 mm).

Figure 10:
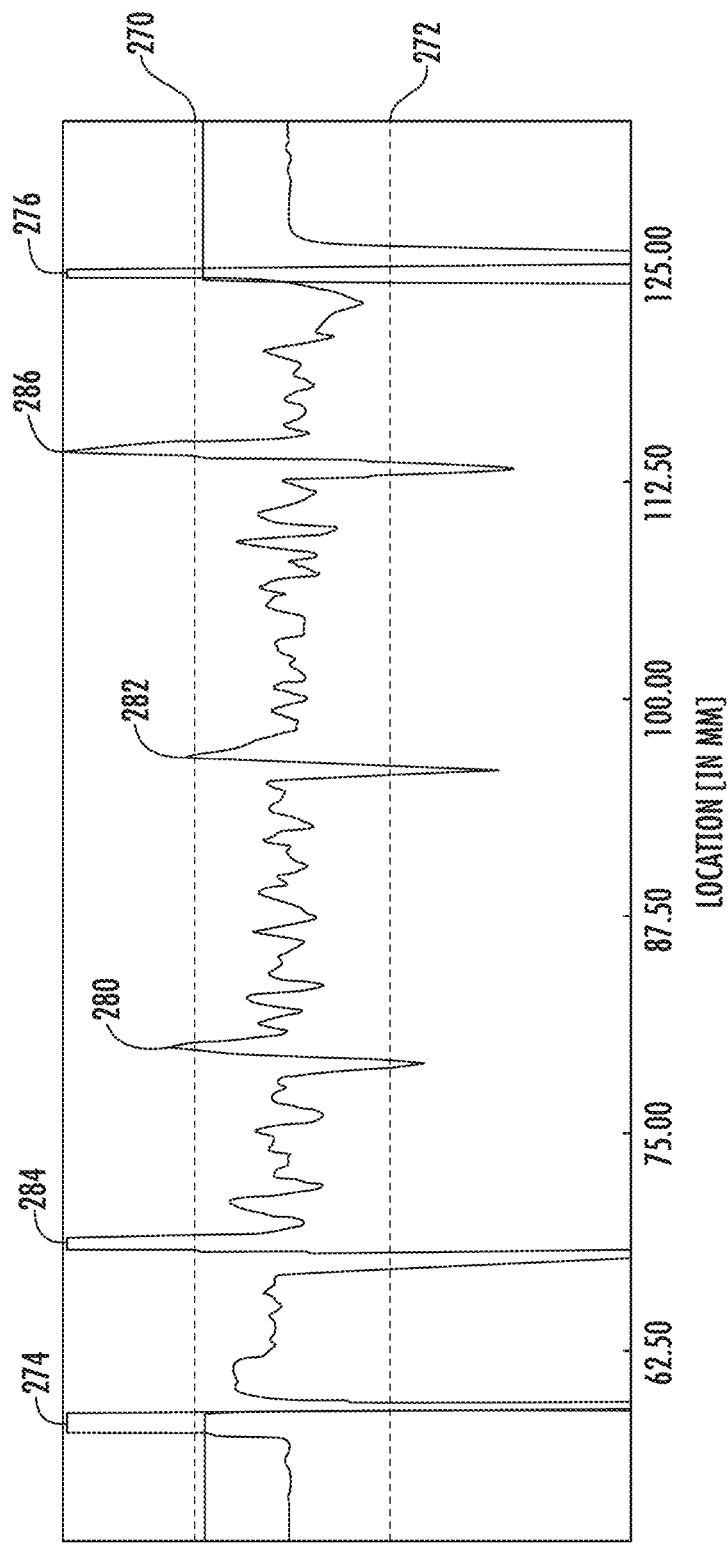
FIG. 10 is a plot of position across the lay-flat web (x-axis) against signal intensity (y-axis) for Film No. 12, described above.

FIG. 10 is a plot of film width position across the lay-flat web (x-axis) as a function of signal intensity (y-axis) for Film No. 12, described above. Upper and lower horizontal dashed lines 270 and 272 represented the software limits that had to be exceeded to establish the presence of a discontinuity. In FIG. 10, the highest signal peaks 274 and 276 (together with the unlabeled signal valleys paired therewith) occurred at the edges of the web, i.e., where the machine vision was looking outside of the width of the lay-flat film tubing. Centrally-located signal intensity peaks 280 and 282 (together with the unlabeled signal valleys paired therewith) occurred at discontinuity locations that exhibited a signal intensity outside of the pre-set limits, and corresponded with the streaks from the 0.0625 inch and 0.125 inch die blockages. Intermediately-located signal intensity peaks 284 and 286 (together with the unlabeled signal valleys paired therewith) represented discontinuity locations that exhibited a signal intensity outside of the pre-set limits, and corresponded with the streaks from the 0.25 inch and 0.50 inch die blockages.

Figure 11:
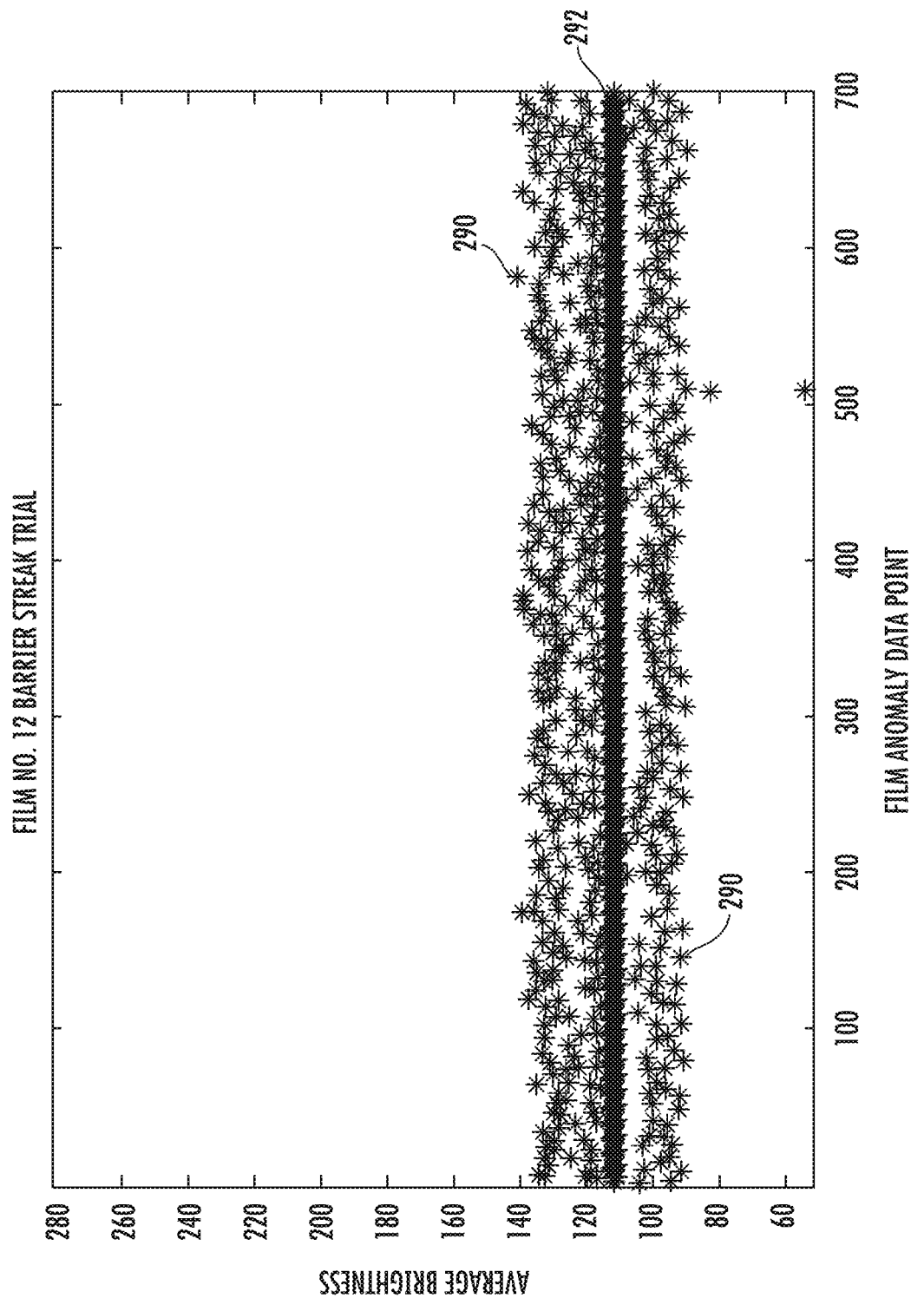
FIG. 11 is a plot of brightness (Y axis) as a function of time (X axis) in the machine vision inspection of Film No. 12. A film anomaly data point was recorded each time the vision system detected a discontinuity in the barrier layer.

FIG. 11 is a plot of film discontinuity data points obtained over time as a function of brightness emanating from an excited indicator present in the barrier layer of Film No. 12. Each data point 290 represents "barrier streak average brightness," i.e., the decreased average brightness level emanating from a portion of the film having a discontinuity which appears as a streak in the barrier layer. Each data point 290 is generated based on data meeting a pre-set threshold of a designated number of consecutive dark pixels (e.g., a continuous string of 100 dark pixels in the machine direction, each pixel being from a different line scan, with the 100 pixels being from 100 consecutive line scans, each pixel being in the same place along each line scan) resulting from each machine direction streak generated by a particular die blockage intentionally placed in the die during the production of Film No. 12. In this manner, each data point represents a discontinuity in the barrier layer corresponding with meeting a pre-set threshold of a designated number of consecutive dark pixels resulting from each machine direction streak corresponding with a particular blockage in the die used to make Film 12. Line 292 represents the mean of barrier streak average brightness.

FIG. 12 is a plot of film anomaly data points obtained over time as a function of brightness for Film No. 11. Data points 296 in the grouping of data points between average brightness level of from 115 to 170 represent the average brightness in a barrier streak in Film No. 11, in the same manner that data points 290 of FIG. 11 represent barrier streak average brightness in a streak in the indicator-containing barrier layer of Film No. 12 illustrated in FIG. 11, described above. Line 298 represents the mean of barrier streak average brightness for data points 296. As with data points 290 in FIG. 11, each data point 296 represents a discontinuity in the barrier layer corresponding with meeting a pre-set threshold of a designated number of consecutive dark pixels resulting from each machine direction streak corresponding with a particular die blockage of Film No. 11. Each of the data points 290 of FIG. 12 corresponds with a string of 100 consecutive dark pixels located in approximately the same position across the web in 100 consecutive line scans from the camera. In this manner, each data point 296 corresponds with a portion of a streak in the film, which streak was caused by the blockage intentionally placed in the die. The blockage interrupted the continuity of the melt flow, or reduced the thickness of the barrier layer in the region of the film affected by the blockage to an extent that the amount of indicator per unit area is not high enough to meet a minimum level of brightness associated with a minimum acceptable barrier layer thickness.

A comparison of the Average Brightness units of FIG. 11 with the Average Brightness level of FIG. 12 cannot be made because in the generation of this data, the light intensity and exposure time settings were different between Film No. 11 and Film No. 12. Also, the concentration of indicator in the barrier layers was different between Film No. 11 and Film No. 12.

FIG. 12 further illustrates film data points 300 for "bright defects," i.e., a plurality of bright spots in the film resulting from the presence of gels, water droplets, and dust present in the film or on the film. Usually, these bright spots are not the result of gels, water droplets, or dust in the barrier layer. Rather, the bright spots emanate from other films layers (seal layer, abuse layer, tie layers, etc). They can emanate from contamination on the surface of the film, i.e., not within the volume occupied by the film. They can also emanate from anomalies between film layers.

FIG. 12 further illustrates film data points 302 for "dark defects," i.e., a plurality of dark spots in the film resulting from the presence of carbon particles and creases present in, on, or of the film. Usually, these dark spots do no emanate from the barrier layer. Rather, they emanate from other films layers (seal layer, abuse layer, tie layers, etc), or from anomalies present on the film outer surface or between film layers.

What is claimed is:

1. A process for assessing continuity of a functional layer of a web, comprising:
    A. forming the web by extruding a thermoplastic material through an annular die to form an annular tape, quenching the tape, collapsing the tape into lay-flat configuration and orienting the tape to produce an annular film tubing;
    B. forwarding the web at a speed of at least 5 meters per minute, the functional layer comprising a blend of a thermoplastic composition and a detectable component, the detectable component being present in the thermoplastic composition so that the detectable component is present at a detectable level in the functional layer;
    C. detecting the presence of the functional layer and a discontinuity in the functional layer, by inspecting the web with a machine vision system capable of detecting the presence or absence of the detectable component in the functional layer; and
    D. generating a signal in response to the discontinuity in the functional layer,
    wherein the inspecting is carried out by scanning the web while the web is in motion and in a lay-flat configuration, the scanning being carried out by a camera positioned downstream of a point at which the tape is quenched and collapsed into the lay-flat configuration.

2. The process according to claim 1, wherein the web is a monolayer web.

3. The process according to claim 1, wherein the web is a multilayer web comprising the functional layer and at least one additional layer.

4. The process according to claim 1, wherein for an unoriented annular tape the machine vision system is capable of generating a signal in response to a layer discontinuity having a size down to at least as small as 2 mm in a machine direction and having a size down to at least 1 mm in a transverse direction, or for an oriented heat-shrinkable film tubing the machine vision system is capable of generating the signal in response to a layer discontinuity having a size down to at least as small as 7 mm in the machine direction and having a size down to at least as small as 3.5 mm in the transverse direction.

5. The process according to claim 1, wherein for an unoriented annular tape the machine vision system is capable of generating a signal in response to a layer discontinuity having a size down to at least as small as 0.2 mm in a machine direction and having a size down to at least 0.1 mm in a transverse direction, and for an oriented heat-shrinkable film tubing the machine vision system is capable of generating the signal in response to a layer discontinuity having a size down to at least as small as 0.7 mm in the machine direction and having a size down to at least as small as 0.35 mm in the transverse direction.

6. The process according to claim 1, wherein the functional layer is a member selected from the group consisting of an oxygen barrier layer, an organoleptic barrier layer, and a moisture barrier layer, hazardous chemical barrier layer, microbial barrier layer, acid layer, acid salt layer, bacteriocin layer, bacteriophage layer, metal layer, metal salt layer, natural oil layer, natural extract layer, layer containing polyhexamethylene biguanide hydrochloride, layer containing paraben, layer containing grafted silane-quaternary amine, layer containing triclosan, layer containing zeolite of silver, copper, and zinc.

7. The process according to claim 6, wherein the functional layer is the oxygen barrier layer comprising at least one member selected from the group consisting of vinylidene chloride copolymer, saponified ethylene/vinyl acetate copolymer, polyamide, polyester, oriented polypropylene, and ethylene homopolymer.

8. The process according to claim 1, wherein the inspecting of the web is carried out over at least 10% of the web.

9. The process according to claim 1, wherein the scanning is carried out by a camera positioned upstream of a point at which the tape is oriented to produce an annular film tubing.

10. The process according to claim 1, wherein the scanning is carried out by a camera positioned upstream of a point at which the annular film is wound up or slit.

11. The process according to claim 1, wherein the detectable component comprises at least one member selected from the group consisting of ultraviolet-indicator, infrared-indicator, dye, pigment, optical brightener, fluorescent whitening agent, and 2,5-thiophenediylbis(5-tert-butyl-1,3-benzoxazole).

12. The process according to claim 1, wherein the detectable component is present in the layer at a level of at least 1 part per million.

13. The process according to claim 1, wherein the detectable component is of a type which, if exposed to radiation at a first peak wavelength, emits radiation at a second peak wavelength.

14. The process according to claim 13, wherein the detecting of the presence of the functional layer is carried out by exposing the detectable component to radiation at the first peak wavelength to generate an excited detectable component, and thereafter detecting the presence of the functional layer and a discontinuity in the functional layer by inspecting the web with the machine vision system while the detectable component emits radiation at the second peak wavelength.

15. The process according to claim 1, wherein the signal generated in response to the discontinuity is used to activate at least one member selected from the group consisting of an alarm, film flagging, displaying an image of a discontinuity, displaying data pertaining to one or more discontinuities, and generating a report of the discontinuity data.

16. The process according to claim 1, wherein:
A) the web is forwarded at a speed of at least 30 meters per minute;
B) the detectable component is present in the thermoplastic composition at a level of from 0.5 to 150 ppm,
C) the detecting of the presence the functional layer and the discontinuity in the functional layer are carried out by inspecting the web with a machine vision system capable of generating a signal indicating the presence or absence of the detectable component in the functional layer, by scanning transversely across the web and generating a signal in response to the presence, absence, and amount of the detectable component present in a functional layer of the web, wherein:
(c)(i) the machine vision system comprises a line-scan camera scanning at a speed of from 50 to 1000 megahertz and at an exposure time of from $2\times10^{-3}$ second to $1\times10^{-5}$ second;
(c)(ii) in an unoriented annular tape the machine vision system is capable of generating a signal in response to a layer discontinuity having a size down to at least as small as 2 mm in the machine direction and having a size down to at least 1 mm in the transverse direction, or in an oriented heat-shrinkable film tubing the machine vision system is capable of generating a signal in response to a layer discontinuity having a size down to at least as small as 7 mm in the machine direction and at least as small as 3.5 mm in the transverse direction; and
(c)(iii) the machine vision system scans with a pixel count of from 500 to 50,000 per scan.

17. The process according to claim 1, wherein:
A) the web is forwarded at a speed of at least 50 meters per minute;
B) the detectable component is present in the thermoplastic composition at a level of from 1 to 20 ppm,
C) the detecting of the presence the functional layer and the discontinuity in the functional layer are carried out by inspecting the web with a machine vision system capable of generating a signal indicating the presence or absence of the detectable component in the functional layer, by scanning transversely across the web and generating a signal in response to the presence, absence, and amount of the detectable component present in a functional layer of the web, wherein:
(c)(i) the machine vision system comprises a line-scan camera scanning at a speed of from 100 to 750 megahertz and at an exposure time of from $7\times10^{-3}$ second to $3\times10^{-5}$ second;
(c)(ii) in an unoriented annular tape the machine vision system is capable of generating a signal in response to a layer discontinuity having a size down to at least as small as 1 mm in the machine direction and having a size down to at least 0.5 mm in the transverse direction, or in an oriented heat-shrinkable film tubing the machine vision system is capable of generating a signal in response to a layer discontinuity having a size down to at least as small as 3.5 mm in the machine direction and at least as small as 1.8 mm in the transverse direction; and
(c)(iii) the machine vision system scans with a pixel count of from 1,000 to 15,000 per scan.

18. The process according to claim 1, wherein:
A) the web is forwarded at a speed of from 60 to 150 meters per minute;
B) the detectable component is present in the thermoplastic composition at a level of from 2 to 10 ppm,
C) the detecting of the presence the functional layer and the discontinuity in the functional layer are carried out by inspecting the web with a machine vision system capable of generating a signal indicating the presence or absence of the detectable component in the functional layer, by scanning transversely across the web and generating a signal in response to the presence, absence, and amount of the detectable component present in a functional layer of the web, wherein:
(c)(i) the machine vision system comprises a line-scan camera scanning at a speed of from 200 to 500 megahertz and at an exposure time of from $2\times10^{-4}$ second to $5\times10^{-5}$ second;
(c)(ii) in an unoriented annular tape the machine vision system is capable of generating a signal in response to a layer discontinuity having a size down to at least as small as 0.2 mm in the machine direction and having a size down to at least 0.1 mm in the transverse direction, or in an oriented heat-shrinkable film tubing the machine vision system is capable of generating a signal in response to a layer discontinuity having a size down to at least as small as 0.7 mm in the machine direction and at least as small as 0.35 mm in the transverse direction; and
(c)(iii) the machine vision system scans with a pixel count of from 3,000 to 9,000 per scan.

19. A process for assessing continuity of a functional layer of an annular film, comprising:
A) forwarding the film at a speed of at least 5 meters per minute, the functional layer comprising a thermoplastic composition and a detectable component, the detectable component being present in the thermoplastic composition so that the detectable component is present at a detectable level in the functional layer;
B) detecting the presence of the functional layer and a thickness of the functional layer by inspecting the film with a machine vision system capable of detecting the presence or absence of the detectable component in the functional layer, and an amount of the detectable component in the functional layer; and
C) generating a signal in response to the amount of the detectable component in the functional layer
wherein the inspecting is carried out by scanning the film while the film is in motion and in a lay-flat configuration, the scanning being carried out by a camera positioned downstream of a point at which the film is collapsed into the lay-flat configuration.

\* \* \* \* \*